United States Patent
Holm

(10) Patent No.: US 11,933,707 B2
(45) Date of Patent: Mar. 19, 2024

(54) DEPICTING OF OBJECTS

(71) Applicant: ChemoMetec A/S, Allerød (DK)

(72) Inventor: Johan Holm, Søborg (DK)

(73) Assignee: ChemoMetec A/S, Allerød (DK)

( * ) Notice: Subject to any disclaimer, the term of this patent is extended or adjusted under 35 U.S.C. 154(b) by 14 days.

(21) Appl. No.: 17/048,423

(22) PCT Filed: Apr. 17, 2019

(86) PCT No.: PCT/EP2019/059945
§ 371 (c)(1),
(2) Date: Oct. 16, 2020

(87) PCT Pub. No.: WO2019/202005
PCT Pub. Date: Oct. 24, 2019

(65) Prior Publication Data
US 2021/0156782 A1    May 27, 2021

(30) Foreign Application Priority Data
Apr. 17, 2018    (EP) .................................... 18167768

(51) Int. Cl.
*G01N 15/02*    (2006.01)
*G01N 15/14*    (2006.01)
(Continued)

(52) U.S. Cl.
CPC ..... *G01N 15/0227* (2013.01); *G01N 15/1434* (2013.01); *G01N 15/147* (2013.01);
(Continued)

(58) Field of Classification Search
CPC ...... G02B 21/14; G02B 21/241; G02B 21/16; G01N 15/1475; G01N 15/0227;
(Continued)

(56) References Cited

U.S. PATENT DOCUMENTS 5,363,190 A * 11/1994 Inaba ...................... H05H 3/04
356/337
5,798,827 A * 8/1998 Frank ................. G01N 15/1459
356/336
(Continued)

FOREIGN PATENT DOCUMENTS

EP          3076219 A1    10/2016
EP          3112918 A1    1/2017
WO       2012035170 A1    3/2012

OTHER PUBLICATIONS

Van Nhu Le, To enhance imaging performance of hybrid imaging systems by using two asymmetrical phase masks; revised Nov. 16, 2015; accepted Dec. 1, 2015; posted Jan. 5, 2016 (Doc. ID 247505); published Feb. 9, 2016; 5 pages.
(Continued)

*Primary Examiner* — Sang H Nguyen
(74) *Attorney, Agent, or Firm* — BakerHostetler

(57) ABSTRACT

A method for characterizing object(s) in a sample includes collecting transmitted, refracted, scattered, diffracted, and/or emitted light from the sample. The collected light formed on a sensor surface includes at least a first and second image of the object(s). For at least the first and second image, the collected light is modulated asymmetrically differently, or for at least a third and fourth image focal plane positions are different, or for at least a fifth image the collected light is modulated in at least two places differently compared to the surroundings, or for at least a sixth and seventh image of the object(s), the collected light is modulated asymmetrically differently and focal planes of the sixth and seventh image have different positions. The images are processed to characterize the objects(s).

17 Claims, 10 Drawing Sheets

(51) Int. Cl.
*G02B 21/14* (2006.01)
*G01N 15/10* (2006.01)
(52) U.S. Cl.
CPC ......... *G01N 15/1475* (2013.01); *G02B 21/14* (2013.01); *G01N 2015/0294* (2013.01); *G01N 2015/1006* (2013.01); *G01N 2015/144* (2013.01); *G01N 2015/1452* (2013.01); *G01N 2015/1454* (2013.01); *G01N 2015/1493* (2013.01)
(58) Field of Classification Search
CPC ............. G01N 15/1434; G01N 15/147; G01N 2015/1006; G01N 2015/144; G01N 2015/0294; G01N 2015/1493; G01N 2015/1454; G01N 2015/1452
See application file for complete search history.

(56) References Cited

U.S. PATENT DOCUMENTS

| | | | | |
|---|---|---|---|---|
| 8,817,115 | B1* | 8/2014 | Venkatachalam | G01N 15/147 348/208.4 |
| 2004/0161780 | A1* | 8/2004 | Minden | G01N 33/6839 435/6.11 |
| 2008/0032325 | A1* | 2/2008 | DiMarzio | G02B 21/18 359/368 |
| 2010/0282984 | A1* | 11/2010 | Kreysing | B03C 5/005 250/492.1 |
| 2010/0291588 | A1* | 11/2010 | McDevitt | G01N 33/491 435/287.1 |
| 2012/0225475 | A1* | 9/2012 | Wagner | G01N 15/1436 435/288.7 |
| 2013/0203108 | A1* | 8/2013 | Evans | B03B 9/00 435/34 |
| 2014/0366638 | A1* | 12/2014 | Sawetzki | G02B 21/32 73/788 |
| 2015/0177118 | A1 | 6/2015 | Johnson et al. | |
| 2015/0268244 | A1* | 9/2015 | Cho | G01N 15/1459 435/7.23 |
| 2015/0276486 | A1* | 10/2015 | Martini | G01N 15/147 356/416 |
| 2016/0011098 | A1* | 1/2016 | Graham | G01N 15/1434 156/196 |
| 2016/0103058 | A1* | 4/2016 | Glensbjerg | G01N 15/1434 382/134 |
| 2017/0016813 | A1* | 1/2017 | Wagner | G01N 15/06 |
| 2017/0261419 | A1* | 9/2017 | Glensbjerg | G06T 7/0012 |
| 2017/0343475 | A1* | 11/2017 | Yamada | G01N 15/1436 |

OTHER PUBLICATIONS

Backlund, Mikael P.; Simultaneous, accurate measurement of the 3D position and orientation of single molecules; Departments of Chemistry and Electrical Engineering and cInstitute for Computational and Mathematical Engineering, Stanford University, Stanford, CA 94305; and Department of Electrical, Computer, and Energy Engineering, University of Colorado, Boulder, CO 80309; 6 Pages.

* cited by examiner

DEPICTING OF OBJECTS

CROSS-REFERENCE TO RELATED APPLICATIONS

This application is the U.S. national stage of PCT/EP2019/059945 filed Apr. 17, 2019, which claims priority of European patent application 18167768.3 filed Apr. 17, 2018, both of which are hereby incorporated by reference in their entirety.

FIELD OF THE INVENTION

Current invention relates to the task of depicting or characterizing objects, such as biological particles and/or elements or parts of biological particles in image cytometry or in microscopy.

DESCRIPTION OF THE RELATED ART

Image Cytometry and microscopy are essential tools in the field of biology, as well as in other fields. The ability to visualize biological particles, both as individual particles or clusters of particles, but also the precise distribution of biomolecules within a single cell and the nucleus has provided scientist with vital information of cellular mechanisms for many decades. Main tools of Image Cytometry are general microscopy, where the direct interaction between a particle and light are considered, but also emission microscopy, such as fluorescence microscopy, where light emitted onto a particle gives rise to emission of light at a higher wavelength.

The objective of image cytometry, regardless of the sample under investigation, is to generate an image depicting an object or a structure present in the sample that is used for quantitative and/or qualitative feature extraction. Since an image of a sample in image cytometry and in microscopy can generally largely be regarded as depiction of the sample background, relative to which the depiction of an object or a structure can be described as conditions where contrast, with respect to image properties, of an object or a structure is different from that of the background. This depicted difference between sample and an object or a structure of the sample, i.e. contrast, is the key element of image cytometry as well as of microscopy.

Contrast is generally expressed as the ratio of signal from the object to the signal from the background, i.e. Contrast equal $S_{object}$ divided by $S_{background}$ where "S" stands for Signal Intensity relating to the effect in question, e.g. result of measured signal originating from the effect under consideration. From the relationship it is clear that increased Contrast could be the result of either increasing signal from object or reducing signal from background. In the case of brightfield imaging, or other techniques where the background is bright, the signal can be either a positive i.e. brighter, or negative i.e. darker level than the background. The contrast depends on the method used, often relating to the methods ability to resolve signal intensities, where sometimes it is necessary to improve contrast reliability by, for instance applying noise-reducing methods, e.g. numerical filtration, or reduce random noise by determining an average image by recording two or more images under identical conditions. Methods with greatest contrast are for instance detection of fluorescence signal, where background signal is virtually non-existing, while the signal from an object is in theory largely limited by the combination of the intensity of the excitation light and the number of fluorochrome molecules present in or bound to the object. Under normal conditions this can give rise to extremely high contrast. However fluorescent microscopy-based assays are labour intensive, usually requiring mixing of sample and fluorescent reagent, thus demand operators with specialized training. Furthermore the method of binding fluorescent molecules to an object are generally very selective, which means that often only a certain fraction of the objects under considerations can give rise to a signal. Finally, counter staining with a fluorescent dye will limit the number of available channels for measurement of other fluorescent dyes. Thus, a high demand for automated Image Cytometer methods and automated Image Cytometer analysis as well as automated microscopy methods and analysis exists that can produce depiction of objects or structures such as biological particles.

Whereas conventional microscopy is a 2-dimensional representation of the field of view, i.e. distribution of visible objects on the 2-dimensional array of detection elements of the image capturing means, it is often of interest to determine spatial position of objects, or parts of objects, in 3 dimensions. Methods of the related art deriving such information are typically based on recording a series of images under condition where the focus plane of the optical system is shifted up and/or down through the sample. The resulting set of images, named Focus Stacks, is subsequently treated in order to determine elevation of different objects, or parts of objects, in the sample. Such treatment of Focus Stacks can be computationally intensive or complicated, making it tedious to perform, for instance when analysis concerns the recording of several fields of view in order to cover an extensive sample. Further the method requires careful control of alignment of the optical system, since deviation from perfect alignment will cause image representation of objects to "move" laterally throughout the stack of images, which means that such "object movement" must be compensated for prior to analysis.

Several systems for automated image acquisition have been developed and are available that can generate vast amounts of image data. With respect to depicting of objects or structures, the major bottleneck within the field of image cytometry is correct identification and/or segmentation of single cells and/or their nuclei in the acquired images. Several studies have focused on this problem which in general can be divided into two approaches.

The first approach relies on determining the cellular compartments and/or cell outline by light microscopy images, such as bright field, dark field, reflectance, transmittance, Phase Contrast microscopy (PC), Differential Interference Contrast microscopy (DIC) and Variable Relief Contrast microscopy (VAREL) The second approach is based on staining the cytoplasm and the nuclei with two or more spectrally different fluorescent dyes. This method often enables segmentation of the cells and nuclei or other cellular elements. However, in addition to the general limitations to fluorescence techniques, a limiting factor in image cytometry and in microscopy is the number of available excitation light sources and emission filters, applied for the generation of fluorescence. Thus, the use of one, two or more spectrally different fluorescent dyes to detect the cytoplasm and the nuclei, greatly limits the number of fluorescent channels available for analysis of samples of biological particles and thus leads to a reduced data output. Another potentially negative effect of fluorescence staining is that the staining itself alters the chemistry and state of the cells, thus changing the conditions which one wants to study.

Many methods of the related art, based on light microscopy have several limitations for the task of identifying objects, such as biological particles and/or parts or segments of biological particles. This is mainly since it is often necessary to apply complicated means in order to establish the necessary contrast between the bulk of the samples, e.g. sample background, and the object(s) of interest. Methods based on simple images, such as bright-field, dark-field, reflectance, transmittance or phase-contrast microscopy, generally fall short when faced with this task, while methods relying on more complex optical setups, such as DIC and VAREL microscopy are more successful. Most of such methods are based on complicated optical components and may even suffer in performance when applied to difficult conditions, such as low optical magnification, or when sample compartment is made from birefringent materials (polymers) are used.

One drawback with the methods currently applied is, that it can be difficult to construct optical component, such as an objective, that is optimized for general applications as well as the specialized applications of light microscopy. This means that often it is necessary to either change components, for instance when changing from DIC microscopy to fluorescence microscopy, or to use components that are based on compromise, thus making it sub-optimal for the different applications.

Another task often encountered in image cytometry or microscopy in general is the determination of focus, or generally the task of determining and/or adjusting the position of an object along the main optical axis. When an object is positioned on, or close to, the focus plane then optimal depiction can be obtained on the image plane. If an object is positioned too far from the focus plane then the depiction on the image plane is compromised, usually described as being "out of focus". Therefore being able to determine absolute or relative position of an object, along the optical axis, provides valuable information, Methods of the related art that can determine position along the optical axis usually include the movement of optical element, sample and/or imaging device relative to each other. Such actions require complicated mechanical means, thus requiring increased complexity and/or prolonged analysis time.

SUMMARY OF THE INVENTION

The invention relates to a method for characterizing one or more objects in a sample, the method comprising the steps of:
  collecting transmitted, scattered, diffracted, or emitted light from the sample, including fluorescent and/or luminescent light, optionally using one or more lens(es), thus forming collected light,
  forming by said collected light on a sensor surface
    at least a first image and a second image of the object(s), wherein for at least the first and the second image the collected light is modulated asymmetrically differently, or
    at least a third image and a fourth image of the object(s), wherein focal planes of the third image and of the fourth image have different positions, or
    at least a fifth image of light of the object(s), wherein for at least the fifth image, the collected light is modulated in at least two places differently compared to the surroundings,
    at least a sixth image and a seventh image of the object(s), wherein for at least the sixth and the seventh image the collected light is modulated asymmetrically differently and focal planes of the sixth image and of the seventh image have different positions, and
  processing
    the at least first and second images, or
    the at least third and fourth images, wherein processing is at least subtracting the third image from the fourth image,
    the at least fifth image, or
    the at least sixth and seventh images
  for characterizing one or more objects in the sample.

The previous methods of depicting objects, such as biological objects, based on the detection of fluorescence signal, have greatly suffered from complex protocols and obviously the limitation in the number of free fluorescent excitation/emission channels, thus resulting in tedious processes with unreliable performance due to fluorescence specificity. The methods of transmitted light microscopy are therefore highly preferred for the task of depicting biological samples, e.g. for the purpose of masking and segmentation of objects, or determination of focus, since the application of such methods does not restrict the possible application of any fluorescence, as no fluorescence signal is used in the process. The simple methods of related art only offer limited contrast under difficult conditions and are therefore not always applicable, while methods and systems according to the present invention generally offer substantial improvement, through only limited complication in the design of the optical system of an image cytometer or of a microscope.

Implementing embodiments of the present invention it has surprisingly been found that it is possible to construct an image cytometer or microscope using components that generally produce optimal performance in all applications, such as optimized transmitted light-microscopy and fluorescence microscopy, without being faced with the task of making a compromise in order to eliminate the need to interchange major optical components, such as a microscope objective. Instead preferred embodiments of the present invention include minute movements of optical component, placed in the light path of the image cytometer or microscope.

Furthermore image recording according to the present invention can be conducted without the movement of optical component, such as sample compartment, objective, lens, image capturing means, which typically can cause change in properties such as change in imaged position of objects, focus or optical magnification, among recorded images of the same field of view.

Embodiments of the present invention offer several novel and inventive approaches to the problem. Many preferred embodiments of the present invention include a phase-contrast based method for depicting, which allows masking of individual biological objects or particles such as cells and/or elements or regions of biological objects such as the nucleus and the cytoplasm of a cell, without the use of fluorescence, thus maximizing the available fluorescence excitation/emission channels of the image cytometer or the microscope for the analysis of biological objects, elements or regions of such objects and thus increases possible data output of the system. Further, methods of the related art apply specialized optical components to form images of improved contrast, such as phase-contrast or DIC images require specialized optical components, such as collection objective, which due to the necessary design are often sub-optimal when applied to other optical methods such as fluorescence imaging. It is therefore a highly preferred advantage of embodiments of the present invention to be able to perform methods for enhanced visualization and masking, applying optical arrangement that is virtually optimal for a number of optical application, without the need to make any modification apart from possibly introduction and/or displacement of modulation means.

Other equally preferred embodiments of the present invention use methods for depicting objects in a sample, allow simple and reliable method for determination of focus of an image cytometer system or a microscope and/or the determination of an objects position along the optical axis. Such focus determination can preferably be used to verify and/or to determine the position of the focus plane of the system, and/or to determine an objects position along the main optical axis between the sample and the image capturing means, i.e. the z-axis of the sample compartment, i.e. the position in the sample along a direction of the light from the sample along the one or more lens(es). Methods according to the present invention allow depiction of z-axis position of objects without the need to change arrangement of optical components, apart from the insertion and/or movement of modulation means. Methods of the related art generally rely on modifying arrangement of optical components, such as altering focus of the image cytometer or a microscope in a series of images, followed by analysis of parameter related to the bulk of objects to determine said z-position, e.g. to determine position of a focus plane. It has been found that methods according to the present invention allow the determination of focus and/or position without changing arrangement of any optical component, apart from insertion and/or movement of modulation means, thus allowing depiction of position information of individual objects, in its own right, which obviously can be combined into position information of the bulk of objects. One preferred embodiment of the present invention is the depiction of z-axis position of individual objects, with accuracy and precision of magnitude that is only a fraction of the physical dimension of the object under consideration, such as a biological object.

The imaging configuration of an image cytometer or of a microscope in several of the preferred embodiments is a configuration similar to that of the infinity corrected microscope configurations. This implies that the objective forms a beam of parallel light or light-bundles, imaged at infinity. The focus lens then brings the beam of light or light-bundles to a focus at the image plane. The term parallel beam is generally used hereafter to denote the ensemble of parallel, or substantially parallel, light or light-bundles in between the objective and the focus lens.

One preferred method of the present invention is based on recording two or more phase-contrast images under virtually identical conditions, except that a phase-contrast element is in different location in the two or more images. The difference in the image information in the two or more images is calculated by subtracting at least two images from each other. The image information in such subtracted images substantially represents difference in phase-contrast conditions in the collected images, and therefore any information, e.g. depicted information, substantially relates to phase-contrast properties of objects, such as biological objects, in the sample. Parts of the image that show no phase-contrast change, e.g. the background regions of the sample, usually comprising liquid material, thereby show virtually no "Signal" while parts of the image that show phase-contrast change, e.g. biological objects, such as cells or elements of a cell, show signal. Thus, it follows that the Contrast of depiction (e.g. an image presentation) resulting from recording and processing images according to present invention is substantial.

Another preferred method of the present invention is based on recording two or more phase-contrast, bright-field, dark-field, scatter, reflectance, transmittance, emission such as fluorescence, or similar images under virtually identical conditions, except that a masking element is in a different location in two or more images. A masking element is typically an optical material, where some regions are transparent while other regions are opaque. The difference in the image information in the two or more images is calculated by subtracting at least two images from each other. The image information in such subtracted images substantially represents difference in light-scatter conditions in the collected images, and therefore any information, e.g. depicted information, substantially relates to scattering properties of objects, such as biological objects, in the sample. Parts of the image that show no light-scatter change, e.g. the background regions of the sample, usually comprising liquid material, thereby show virtually no "Signal" while parts of the image that show light-scatter change, e.g. biological objects, show signal. Thus, it follows that the Contrast of depiction (e.g. an image presentation) resulting from recording and processing images according to present invention is substantial.

It has been surprisingly found that using preferred methods of the present invention it is possible to depict object of a sample, such as biological objects or even parts or sections of biological objects, with adequate contrast and/or z-axis elevation, such as is necessary to display visual imagery of a sample or even to apply such depictions for the task of visualization and/or masking and/or positioning objects, such as biological objects and/or parts or segments of biological objects as well as to apply such depictions for the task of determining focus of an image cytometer or of a microscope.

Throughout this application, the second image can be the first image and the first image can be the second image, the fourth image can be the third image and the third image can be the fourth image, and the seventh image can be the sixth image and the sixth image can be the seventh image.

The expression "asymmetric" is to be understood in relation to the optical axis of the depicting system like the general path of light through objective(s), and/or the one or more lenses, in relation to the collected light, in relation to the collected light that reaches the sensor surface, in relation to the light falling unto the sample, in relation to the direction of the light from the sample, in relation to the a main angle of the collected light from the sample (the light can have an uneven angle distribution, and/or the main angle of the collected light can deviate from the optical axis of the one or more lenses, e.g. at side scattering (studying scattered light from a sample illuminated by an illumination element with an incidence angle in relation to the normal angle of the sample surface that is above 10°, preferably above 12°, more preferably above 15°, and most preferably above 20°)), or maybe in relation to the main axis of light from an illumination falling unto the sample if the main axis does not coincide with the optical axis.

The collected light can also be radiation outside the visible range and even propagation of elementary particles, since such particles have a wave nature.

Since the objective of the present invention is to characterize one or more objects in the sample, it is the light from the sample that is of interest—how the sample influences the light. Whether the light is transmitted, refracted, scattered (e.g. Mie scattering, Raleigh scattering, Raman scattering, Brillouin scattering, Compton scattering, Bragg scattering), diffracted, or emitted (e.g. fluorescence, phosphoresce bio-chemo-electro-luminescence) light from the sample is of less importance as long as the studied light carries information about the sample and the objects in the sample.

The lens(es) is/are not necessary. The sensor surface can e.g. be positioned on the inside of a half-sphere, an elliptic paraboloid or something similar with the sample in a centre point or focus point or a point close to any of the centre or focus points. The light from the sample can be collected by the sensor surface without any lens system and a software is configured to calculate how the sample and/or the objects are positioned to each other. The modulation will be asymmetric in relation to the light from the sample.

The light from the sample can be collected by one or more lens(es), or by one or more electrostatic, einzel, quadrupole or magnetic lens(es), or some other means that can guide light or particles, thus forming collected light, that can be focused onto an image plane or a sensor surface of an electrical device, which can record a two-dimensional picture, such as a digital camera such as a CCD or CMOS digital camera.

That the collected light forming the first image and forming the second image is modulated asymmetrically differently does not necessarily mean that the collected light for both images are modulated. It is enough that the collected light for one of the images is modulated asymmetrically. If the collected light forming both images is modulated, the modulation cannot be the same.

That the collected light forming the first image and the second image are modulated asymmetrically differently can mean that part of the collected light of at least one of the images is modulated, e.g. by being blocked on one side but not on the other or more on the other side than on the other. Instead of the part of the light being blocked, the part can be modulated so that just a fraction of that part of the light passes the modulation, while the rest of the light is not influenced. Since it is not the modulation that is studied, but the modulation of the light is a way to extract the different information about the objects in the sample that the light carries in different parts of the ray of light, it is not so important how the light is modulated (by 100% blockage of a part of the light, by letting a fraction (e.g. 30% transmittance) of a part of the light through with another fraction (e.g. 90% transmittance) of the rest of the light, or phase shifting a part of the light more or less than the rest the light)—just that the light is modulated asymmetrically.

If an object is positioned in the focal plane of a first lens, a second lens, illuminated with light from the object through the first lens, will form a sharp, in focus depiction of the object in the focal plane of the second lens. If the object is positioned a little further away from the first lens than the focal plane of the first lens, then the depiction will be in focus in front of the focal plane of the second lens. Likewise, if the object is positioned a little closer to the first lens than the focal plane of the first lens, then the depiction will be in focus behind the focal plane of the second lens. The depiction of the object in both of the two last situations, the depiction will be a little blurry. The first and the second lens can be the same lens so that the light from the sample is focused onto the sensor surface by one lens.

If one side of the collected light—e.g. the upper side of the collected light—between the object and the depiction of the object is modulated—that means that the collected light is modulated asymmetrically—the depiction of the object positioned on the focal plane of the first lens will lose a little in intensity but not otherwise manipulated. If instead the object is positioned further away from the first lens than the focal plane of the first plane, the same modulation of the collected light will cause the depiction of the object to move upwards on the sensor surface because the removed light would have contributed to the lower part of the depiction. If instead the object is positioned closer to the first lens than the focal plane of the first plane, we have the opposite result—the depiction moves downwards on the sensor surface.

By comparing, e.g. by numerical subtraction, two images where the collected light has been modulated asymmetrically in one of the two images or where the collected light has been modulated asymmetrically in different ways in the two images, the contrast at the edges of the objects is increased. To see the boundary of a cell can be quite a challenge, especially when the cell is lying on a surface, since except for the cell nucleus, the rest of the cell is very thin, but using the method of the present invention, the contrast even at the boundary of the cells is high enough so that the boundaries can be easily seen.

The further away from the focal plane of the first lens an object is positioned, the more the depiction of the object will move on the sensor surface when the light is asymmetrically modulated e.g. by asymmetrically inserting a modulation means. So how much the depiction is shifted depends on the distance from the focal plane of the first lens. The relationship is more or less linear. In addition to determining the x- and y-coordinates of the objects on the sensor surface, this method can determine the z-coordinate of each object. It is also possible to determine the absolute value of the z-coordinate, whether the object is behind or in front of the focal plane of the first lens.

That it is possible to determine the z-coordinate of an object can be utilized to tune the lens system so that a particular object is in focus. The z-coordinate of the particular object is determined, which is the distance between the object and the focal plane of the first lens. Defined by the characteristics of the optical system it is possible to relate the distance between the object and the focal plane to the required movement of a lens, in order to establish a focus plane in a predetermined position. The first lens is moved the determined distance between the particular object and the focal plane of the first lens, and the particular object is focus. This method is fast.

If for at least a fifth image of light of the object(s), the collected light is modulated in at least two places differently compared to the surroundings, we will also end with an image with increased contrast. Each of the two places modulated differently compared to the surroundings will form an image, where objects out of focus will move compared to when the collected light is not modulated. So the two formed images will move the objects out of focus differently, and the two images will be superimposed on top of each other creating an image with increased contrast at the boundaries of the objects out of focus. Modulating the collected light in at least two places differently compared to the surroundings and capturing the objects in one image only will enable the studies of faster movements, since the two superimposed images are captured at the same time.

The contrast of the boundaries of cells is increased, background variation is eliminated/reduced and signal-to-noise ratio is increased by comparing a third image and a fourth image, e.g. by subtraction, wherein the focal planes of the two images have different positions. The focal planes can be the focal plane of the first lens, or the focal planes can be the focal plane of the second lens.

If the focal plane for the third image is on the sensor surface, while the focal plane for the fourth image is not on the sensor surface, the fourth image will be a little blurry and the depiction of the object in the fourth image will be a little larger than the depiction in the third image. Subtracting the third image from the fourth image or vice versa will form an image with increased contrast at the boundaries. The boundaries of cells lying on a surface will be more visible.

That the collected light of the sixth and the collected light of the seventh image are modulated asymmetrically differently and the focal planes of the sixth image and of the seventh image have different positions enables an even more effective reconstruction of the phase of each part of the light leaving the sample and/or the objects of the sample. Fewer images may have to be recorded saving time and reducing bleaching of the sample.

In an embodiment of the method, the method can further comprise the step of: illuminating the sample with incident light from an illumination element or exposing the sample to a chemical reaction, to an electrical current and/or voltage, or to stress.

This step relates to the source of the collected light from the sample. The sample can be illuminated by a light source. The transmitted or scattered light or the photoluminescence leaving the sample will carry information of the objects in the sample and can be collected and studied using the present method.

The source can be a chemical substance that reacts with objects in the sample emitting light during and/or after the reaction.

The source can be an electrical current driven through the sample or an electrical potential applied across the sample that causes objects in the sample to emit light that can be studied.

The sample can be exposed to mechanical stress in various forms, which will result in objects in the sample emitting light.

If the sample is a solid having a somewhat crystalline structure, the incident light from a light source can undergo Bragg diffraction that can also be studied using this technique.

All these kinds of sources can be used to produce light from the sample that will comprise information about objects in the sample.

In an embodiment of the method, the method can comprise the step of placing the sample in an image cytometer, an imaging flow cytometer, in an image cytometer that is not a flow cytometer, or in a microscope.

An image cytometer like an imaging flow cytometer or an image cytometer that is not a flow cytometer, is a very suitable instrument to use when performing the method according to the present invention, since a bright field image, a dark-field image and a fluorescent image can all be used to depict the objects.

A microscope is also a very suitable instrument to use when performing the method according to the present invention. To increase the contrast, to be able to determine not only the lateral coordinates of an object but also the z-coordinate, and to move an object into focus within short time are all desirable functionalities of a microscope.

In an embodiment of the method, the step of processing the at least first and second images can comprise
 subtracting the first image from the second image or sixth image from the seventh image,
 calculating the mean value of the first image and the second image or of the sixth image and the seventh image,
 calculating the ratio between the first image and the second image or between the sixth image from the seventh image,
 cross-correlating the first image and the second image, the third image and the fourth image, or the sixth image and the seventh image, or
 deconvoluting the first image and/or the second image, the third image and/or the fourth image, the fifth image, or the sixth image and/or the seventh image.

Subtracting the first image from the second image or the sixth image from the seventh image will give a resulting image with increased contrast.

The mean value of the first image and the second image can be understood to mean that the mean value is of each pixel so that the mean value of the first image and the second image results in yet another image, where the value of each pixel is the mean value of the values of the same pixel of the first image and the second image.

Cross-correlating the first image and the second image, the third image and the fourth image, or the sixth image and the seventh image will result in a resulting image with increased contrast, or quantified translation between the first image and the second image, the third image and the fourth image, or the sixth image and the seventh image. The quantified translation has the advantage that the translation of a depiction of an object can more easily be determined.

The advantage of deconvoluting the first image and/or the second image, the third image and/or the fourth image, the fifth image, or the sixth image and/or the seventh image is that the resolution can be increased, and if deconvoluting at least the first image and the second image, the third image and the fourth image, or the sixth image and the seventh image the phase information of the light from the objects can be reconstructed and also a three dimensional image of the sample and/or the objects can be reconstructed.

In an embodiment of the method,
 processing the at least first and second images can comprise comparing the first image with the second image and determining the focus of the image cytometer or of the microscope based on a translation of a depiction of the one or more objects in the two images, or
 processing the at least third and fourth images can comprise comparing the third image with the fourth image and determining the focus of the image cytometer or of the microscope based on a change in the contrast of a depiction of the one or more objects between the two images, or
 processing the at least fifth image can comprise determining the focus of the image cytometer or of the microscope based on at least one of the objects, where an elongation of a depiction of the one or more objects is determined in the fifth image, or
 processing the at least sixth and seventh images can comprise comparing the sixth image with the seventh image and determining the focus of the image cytometer or of the microscope based on a translation of and/or a change in the contrast of a depiction of the one or more objects in/between the two images.

An object, which depiction does not change position between the first image and the second image, or between the sixth image and the seventh image, will be in focus. The modulation will only change the position of the depiction of an object between the first and second images or between the sixth and seventh images if the object is not positioned in the focal plane of the one or more lens(es) or the first lens.

Of a number of objects, an object, which depiction increases or decreases most in size (relative or in absolute numbers) when going from the third image to the fourth image, will be considered to be in or close to the focal plane of the first lens in the third image, and in the fourth image, respectively. The method can comprise a software that is configured to compare the sizes of all or most objects in the third image and the fourth image and determine the object in the third image and/or in the fourth image that is closest to the focal plane of the first lens.

With a depiction of an object and/or of elements within the object like, if the object is a cell, the parts of a cell mentioned below, the contrast of the depiction will change from lighter to darker when the focus is shifted from in front of the object to behind the object or vice versa, With a number of objects, objects that are lighter and stay lighter also after the focus shift are all positioned on the same side of the focus plane, while objects that are darker and stay darker both before and after the focus shift are all positioned on the other side of the focus plane. Objects that change contrast during the focus shift are close to the focus plane before and/or after the focus shift. Objects in the focus plane of the one or more lenses yield depictions with the least contrast, so objects which depictions change from having or to having a low contrast or a lower contrast than the depictions of the other objects will tell that the focal plane was before or is after the change of the focal plane at said object. Based on this information a software can be configured to determine, where the focal plane is, and which objects that close to or in the focal plane before or after the focus shift.

The elongated shape of the depiction of an object due to the manipulation will always be in the same direction. If the depiction of an object in the fifth image has the shape as expected based on the objects in the sample, i.e. the length axes in two perpendicular directions in the plane of the fifth image have the relationship corresponding to the relationship of the long and short axes of the object, it can be assumed that the object is in the focus plane of the first lens.

In an embodiment of the method, the direction of the light from the sample along the one or more lens(es) can define an axis, wherein
  processing the at least first image and the second image can comprise comparing the first image with the second image and determining the position along the axis of at least one of the objects based on how much the at least one object has moved between the at least first image and the second image,
  processing the at least fifth image can comprise determining the position along the axis of at least one of the objects based on an elongation of the depiction of the objects,
  processing the at least sixth image and the seventh image can comprise comparing the sixth image with the seventh image and determining the position along the axis of at least one of the objects based on how much the at least one object has moved between the at least sixth image and the seventh image.

The further away from the focal plane of the first lens or the one or more lens(es) an object is positioned, the more the depiction of the object will move on the sensor surface when the light is asymmetrically modulated e.g. by asymmetrically inserting modulation means like e.g. a blocker. So how much the depiction is shifted depends on the distance from the focal plane of the first lens. The relationship is more or less linear. In addition to determining the x- and y-coordinates of the objects on the sensor surface, this method can determine the z-coordinate of each object. It is also possible to determine the absolute value of the z-coordinate, whether the object is behind or in front of the focal plane of the first lens or the one or more lens(es).

In an embodiment of the method, the light from the sample can comprise emitted light from the sample of at least a first wavelength and a second wavelength, and wherein the method comprises the step of determining whether at least one of the objects has emitted light with the first wavelength or the second wavelength.

Most if not all lenses show chromatic aberration at a higher or lower degree. The reason is that the refractive index varies with the wavelength. If the abovementioned method of the present invention has been used to determine which objects are in the same plane (have the same z-coordinate), or it has been determined, that all objects or all of one or more particular kinds of objects are in the same plane, in some other way, and the objects are in the focal plane of the first lens, then the chromatic aberration of the one or more lenses will cause different wavelengths of the collected light to be moved differently much on the sensor surface due to the asymmetric modulation. The first determination of z-position can preferably be made in an imaging mode using a spectrally narrow band. This could e.g. be an LED based side-scatter mode. If the z-position of each object is determined, it is not a pre-requisite that all objects are in the same focal plane in order to determine their spectral distribution in a subsequent measurement.

Many glasses like e.g. lanthanum dense flint, dense flint, flint barium crown, borosilicate crown and fluorite crown have a declining refractive index with increasing wavelength at least within the interval of 300 nm and 2500 nm. That means that shorter wavelengths emitted from the objects will experience a higher refractive index and the first and second lenses will have shorter focal lengths for shorter wavelengths than for longer ones. If collected light from an object with a short wavelength is focused in front of the screen surface and the collected light is symmetrically modulated e.g. by blocking at the upper part of the collected light the depicted object will move upwards on the sensor surface. The same modulation will move the depiction of objects with light with even shorter wavelengths upwards even more. The same modulation will move the depiction of objects with light with longer wavelengths upwards less. Eventually, for light with much longer wavelengths the focus will be behind the sensor screen and the move will be downwards.

For wavelengths outside 300 nm and 2500 nm, glass may still have the characteristic that the refractive index declines with increasing wavelength. If it is of interest to study objects within wavelength ranges, where glass do not show this characteristic, lenses made of other material has to be found. Of course, if within the range of interest the refractive index increases with increasing wavelength that is no problem as long as the refractive index does not change from increasing to decreasing with increasing wavelength or vice versa.

In an embodiment of the method, the method can comprise the step of determining the wavelength of emitted light from the sample.

By calibrating the system, e.g. by sending light with some known wavelengths from the position of the sample or from the focal plane of the first lens through the lens(es) and unto the sensor surface with and without an asymmetric modulation, it will be possible to determine the wavelength(s) of the light e.g. emitted from an object based on how much the depiction of the object moves in response to the asymmetric modulation. It will be possible to study which objects emits light e.g. due to fluorescence or luminescence at one wavelength, and which objects emit at another wavelength, and also which wavelengths that are involved. Based on the dependence on the refractive index on wavelength and the focal length at a known wavelength of the lens(es) involved, a software could be configured to calculate, where a certain wavelength would move on the sensor surface based on a certain asymmetric modulation. This calculation could be used instead of or in addition to the calibration.

In an embodiment of the method, that the collected light is modulated asymmetrically can mean
blocking some of the collected light, and/or
phase shifting some of collected light.

Blocking some of the collected light can mean inserting a modulation means blocking one side of or part of the light, or inserting a plate with an opening or a part that is cut away, where the opening or the cut away part is asymmetrically positioned.

Phase shifting some of collected light can mean inserting a phase shifter phase shifting one side of or part of the light, or inserting a phase shifter with an opening or a part that is cut away, where the opening or the cut away part is asymmetrically positioned and does not phase shift the light or phase shift the light differently than the rest of the phase shifter. Phase shifting the collected light asymmetrically for one image but not for the other image, or phase shifting the collected light asymmetrically in one way for the one image and in another way for the other image will result in a difference in the contrast so that e.g. a numerical subtraction of the one image from the other image will give an resulting image with increased contrast and reduced background. Phase shifting the light instead of blocking the light will not reduce of the intensity of the collected light from the sample reaching the sensor surface, and fainter objects can be studied and/or less light illuminating the sample is needed resulting in less bleaching.

In an embodiment of the method, wherein
the first and the second images can both be asymmetrically modulated and symmetrically asymmetrically modulated,
the collected light modulated in at least two places differently compared to the surroundings can be symmetrically modulated, or
the sixth and the seventh images can both be asymmetrically modulated and symmetrically asymmetrically modulated.

The two asymmetrical modulations or the two places are symmetric in relation to the same axis, or directions as each of the asymmetrical modulations is asymmetric in relation to, e.g. the optical axis of the one or more lens(es).

That the light for the first and the second images or the sixth and the seventh images is symmetrically asymmetrically modulated means that the collected light for each image is modulated by inserting a plate with an opening, inserting a blocker, or inserting a phase shifter on one side of the axis of symmetry, and where the plate, opening, blocker and/or phase shifter for the one image is/are the mirror image of the plate, opening, blocker and/or phase shifter for the other image, when mirrored in the axis of symmetry.

That the collected light for the fifth image is symmetrically modulated in a first of the two places and in a second of the two places means that the modulation in the second place corresponds substantially to the same modulation in the first place, where the first place and the second place are the mirror image of each other in relation to the axis of symmetry.

The two places, where the collected light for the fifth image is modulated, can be symmetric to each other in relation to a symmetry axis.

The advantage is that one image will not be much fainter than other image. This is especially important when the light intensity from the sample is already low. Another advantage is that the true position of a depiction of an object is always known as the position in the middle of the depiction in the one image and the depiction in the other image.

In an embodiment of the method, that the collected light is modulated asymmetrically, or the collected light is modulated in at least two places differently compared to the surroundings can be achieved by inserting
a plate with at least one or two openings,
at least one or two opaque regions, and/or
at least one or two phase shifting regions
in the collected light.

The two openings, opaque regions, or two regions phase shifting the light are preferably non-adjacent to and/or non-adjoining each other and/or do not touch each other.

The opening in a plate with one opening will function as an aperture that will increase the depth of field. Even though, the depiction of an object is in focus in front of or behind the sensor surface the opening will render the depiction to appear sharp on the sensor surface, which will make it easier to measure and/or calculate how much the depiction has moved on the sensor surface due to the asymmetrically positioned opening. The opening is preferably more than 0.5 mm and less than 25 mm, more preferably more than 1 mm and less than 16 mm, even more preferably more than 3 mm and less than 13 mm and most preferably more than 6 mm and less than 11 mm. That will give high depth of field.

With two openings in a plate, each opening will also function as an aperture that will increase the depth of field. The fifth image will be the two depictions of the object superimposed on each other. Since both depictions will be in focus, the depictions will be sharp and it will be easy to measure and/or calculate how much the depictions have moved on the sensor surface due to the two openings. The size of each of the two openings is preferably the same as for one opening.

One opaque region asymmetrically positioned in the collected light will influence the collected light asymmetrically moving the depictions of objects on the sensor surface without reducing the intensity of the collected light as much as a plate with one opening. Very faint objects can still be studied this way. Likewise, two opaque regions asymmetrically positioned in the collected light can be used when forming the fifth image. The two opaque regions will have the same advantage as mentioned for the one opaque region asymmetrically positioned in the collected light.

One phase shifting region asymmetrically positioned in the collected light will influence the collected light asymmetrically moving the depictions of objects on the sensor surface without reducing the intensity of the collected light. Very faint objects can still be studied this way. Likewise, two phase shifting regions asymmetrically positioned in the collected light can be used when forming the fifth image. The phase shifting regions will have the same advantage as mentioned for the one phase shifting region asymmetrically positioned in the collected light.

The fifth image can also be used to determine the z-coordinate of each object. Of two objects, a first object positioned in the focal plane of the first lens, and a second object not positioned in the focal plane of the first lens, the depiction of the first object will be in focus in the focal plane of the second lens, while the depiction of the second object will not. The depiction of the second object will be a little enlarged or elongated and possibly there are two distinctive depictions on the sensor surface one from each of the at least two places, where the collected light is modulated differently compared to the surroundings. The enlargement of the depiction or the distance between the two depictions of the same object will be a measure on how far from the focal plane the object is positioned.

In an embodiment of the method, the illumination element can be a source of light emitted in the range between 200 nm and 1,000 nm, in a first preferred embodiment the range is between 250 nm and 800 nm, more preferably in the range between 300 nm and 700 nm, or in a second preferred embodiment the range is between 250 nm and 400 nm If the range is between 250 nm and 400 nm, the contrast of the depiction is increased.

In an embodiment of the method, the one or more objects can be in a suspension or in a colloid, where a dispersion medium of the suspension or the colloid is a solid, a liquid, or a gas.

If the dispersion medium of the suspension or the colloid is a liquid or a gas, the objects can be moving around before the objects settle at the bottom. The mobility of the objects until the objects settle at the bottom can be studied using the method of the present invention.

In an embodiment of the method,
processing the at least first and second images can comprise comparing the first image with the second image and determining,
processing the at least fifth image can comprise determining, or
processing the at least sixth and seventh images can comprise comparing the sixth image with the seventh image and determining
phase quantification properties of an object in a sample, preferably where phase quantification properties include change in phase or a phase shift.

To quantify phase properties or the phase shift of the light when passing through the sample or at least a part of the sample is advantageous, since the determination of the phase shift can preferably be used to determine physical thickness and/or optical thickness of the sample and/or the object, such as a biological particle or a biological cell.

In an embodiment of the method, processing the image or images for characterizing one or more objects in the sample can comprise the step of segmenting the object.

Segmenting an image can mean selecting or isolating certain portions of an image. This may lead to the image being divided or segmented into two or more regions or it may lead to a single region being isolated from the original image. Separated or isolated regions may be assigned certain values. For example, an isolated background may be given a value of zero or a selected background value. For images with multiple isolated regions, each region may be assigned different values. Masking may further include outlining one or more regions of an image to determine the edge or boundary of the regions. Since the present invention provides a method that can provide images of depictions of objects with increased contrast the present invention is suitable for segmenting the object. Segmenting the object according to the present invention is therefore fast and e.g. without the need to have to stain the object for fluorescence measurements, where the stain could influence the object chemically, so that the object e.g. is more prone to bleaching.

In an embodiment of the method, the object can be a cell, and segmenting the cell can comprise identifying part of a cell, such as cytoplasm, mitochondria, golgi apparatus, lysosome, lipid globules, endoplasmic reticulum, vacuole, chloroplasts, flagellum, nucleolus, stress granule, cytoskeleton, centrosome, cell wall, cell membrane, nuclear membrane, foci comprising biomolecules or in general any element or region of a biological particle.

Segmenting a cell is in many situation a very important task when studying and characterizing the cell. Often it is advantageous to study the cell alive. It is then an advantage that the procedure is fast and without the need of chemical substance like stain that could potentially kill the cell. A too long exposure time that could bleach the cell can also be avoided.

The invention also relates to a system for characterizing one or more objects like a biological object and/or element or region of a biological object in a sample, where the system is configured to perform the method steps as described herein.

The task of depicting an object or a part of an object, such as a biological object or a part or segment of biological object is the task of producing information that reveals presence, form, shape or boundary, position or focus of said object, biological object or part or segment of a biological object, visible in field of view of an image cytometer or of a microscope.

A sample is generally part of sample material, such as a volume of sample material, an area of a surface, such as a histological sample or tissue sample or substrate wall, on which biological object adhere, for instance where biological object are growing on a substrate. In fact any subject to be imaged, being a sample in an image cytometer or in a microscope, surface or structure, irrespective of size, any scenery such as landscape, can be regarded as sample, since the methods of the present invention can be applied to any such task of depiction of objects in a sample.

An object in a sample is typically anything other than the general sample-matrix. Sample-matrix representation, either present globally or locally in an image recording of light information is generally termed image-background and therefore an object is anything that can be identified as being different from the background in an image. The object is often a particle and in the field of biological or biochemical analysis it is often a biological object or particle, such as a cell, for instance animal, plant, fungi or bacteria cell. Regarding the depiction of a solid sample, such as a tissue sample, an object can be any structure and/or feature that can be separated from the general sample matrix, such as a tissue cell or an element of a tissue cell. A biological object can be any object or a biological object can mean only a biological object.

Sample compartment is a confined space in which the sample being analyzed is contained. In some cases the sample compartment is defined by a single surface, such as when the sample is a drop of liquid placed on a sheet of glass, but in other cases sample compartment is defined by at least two surfaces, often where two of which are substantially parallel sheet of transparent material, forming between them a sheet of sample, such as a liquid sample.

Throughout the present disclosure depicting a sample or an object or a structure in a sample is to be understood as the process of generating an image of a sample where contrast between an object or a structure is "visible"; visible in the sense that it can be either viewed as different from the background by an operator, for the purpose of visualization, or by a computer application, for the purpose of calculation such as transformation.

In Image Cytometry and in microscopy the image is typically gathered using electrical device, such as a digital camera. Therefore, the term Image is any form of visualization or digital presentation of data. Data in an image can often be the data as recorded by the digital camera but more often it is data resulting from mathematical transformation of recorded data, including data from more than one recording, such transformations carried out by software applications on a computer.

When image is recorded it is generally advantageous that virtually all conditions are unchanged, throughout the duration of the recording. Conditions of recording can vary from one situation to the next, depending on the nature of light information and/or condition of an image cytometer or of a microscope, such as variable time of signal integration, depending on intensity of light information, or acquisition of two or more single recordings combined to an image recording, for instance when the noise contribution of the system can be reduced, in order to produce recorded image of better statistical quality, e.g. lower level of random noise.

Depiction according to the present invention usually involves processing of recorded images of light information, including of course any such processing of the related art termed image processing. Processing, generally digital processing, further includes transformations such as additive or multiplicative processing, e.g. addition or subtraction of recorded images, filtration, convolution, just to mention a few. Further it includes determining changes in position and/or intensity of light information from one recorded image to another.

Throughout the present disclosure, where depicting of an object in a sample is the bases for masking, masking is to be understood as the process of separating or isolating one or more regions of an image and/or detecting edges or boundaries of one or more regions in an image and/or boundaries between regions, for example a region can be a cell, or part of a cell, such as the cytoplasm, mitochondria, golgi apparatus, lysosome, lipid globules, endoplasmic reticulum, vacuole, chloroplasts, flagellum, nucleolus, stress granule, cytoskeleton, centrosome, cell wall, cell membrane, nuclear membrane, foci comprising biomolecules or in general any element or region of a biological object. Masking includes separating depiction of an object, i.e. an image of an object or a segment or section of an object, from its background and/or removing the depiction of the background of an image.

Furthermore, it also can include segmenting an image or selecting or isolating certain portions of an image. This may lead to the image being divided or segmented into two or more regions or it may lead to a single region being isolated from the original image. Separated or isolated regions may be assigned certain values. For example, an isolated background may be given a value of zero or a selected background value. For images with multiple isolated regions, each region may be assigned different values. Masking may further include outlining one or more regions of an image to determine the edge or boundary of the regions.

Image plane of the image cytometer or of the microscope is the position of the image capturing means, e.g. a digital camera. The position of the image capturing means can also be called a sensor surface.

The main optical axis of the image cytometer or of the microscope is an axis along the direction between the sample compartment and the image plane of the image cytometer or of the microscope.

Focus plane of the image cytometer or of the microscope is the position along the main optical axis, where light rays originating from a point in the sample converge to a point on the image plane.

Focus or position of an object, such as a biological object, is preferably a measure of its position relative to a reference point, such as the focus plane of the optical system of the image cytometer or of the microscope, or position relative to another object. This is usually be related to position in the sample compartment along the main optical axis, i.e. position along the z-axis of the sample compartment, preferably when the position of the sample compartment relative to the focus plane is known.

Furthermore, the terms waveband and wavelength band are used throughout the disclosure for a range of electromagnetic wavelengths or frequencies substantially located between two given limits. These electromagnetic wavelengths include light in the visible spectrum as well as ultraviolet light and infrared light.

The term staining is used for describing the technique used in microscopy to enhance contrast in microscopic images. This technique is frequently used to highlight structures in biological tissues for viewing, as well as to highlight biological objects, or parts of biological objects. Staining may be performed using a single dye to enhance the contrast of the sample or using two or more dyes to enhance the contrast.

Throughout the present disclosure, the term boundary is to be understood as the edge or perimeter of an area or region. This includes the boundary of an object, cell, particle or element as well as the boundary between areas or regions. The boundary of a biological object may refer to the outer edge, or the perimeter, as shown in an image of the object taken from a given point of view. A boundary may also be used to describe the edge or periphery of a sub-region of an object or element. The boundary of a cell may refer to the cell membrane, cell wall or cell capsule.

The term circumference of an element or region is to be understood as the distance around said element or region as represented in an image. In the case of the circumference of a boundary, this corresponds to the length of the boundary. The circumference of a biological object is then the distance along the outer edge or the perimeter of the object as shown from a given point of view.

DESCRIPTION OF THE INVENTION

Analysis of objects in a sample, such as biological objects, using cytometry, such as image cytometry, or using microscopy often relies on depicting of objects, for instance for the purpose of visualization of objects, or for the purpose of masking, where masking is the method of determining region(s) of interest. Further depicting of objects includes methods of determining position, for instance position of objects relative element of an image cytometer or of a microscope, such as parts of a sample compartment or a focus plane of the image cytometer or of the microscope, or position of objects relative to each other or determination of parts of an object relative to the object and/or parts or section of the object.

Preferred implementations of the present invention include methods for depicting of biological object and subsequent masking, such as to determine its boundary, and methods for masking elements or regions of biological objects and/or determination of position and/or focus of biological objects and further. Method of related art, capable of performing such depiction, generally requires specialized optical components and/or specialized arrangement of optical components, resulting in complication of design and operation. Also when considering specialized arrangement such as firstly, analysis such as bright-field, dark-field, phase-contrast, reflectance, transmittance analysis generally methods based on detection of high light intensity, and secondly methods such as fluorescence that rely on detection of very low or, even extremely low, light intensity, it requires either compromise in optical performance, due either to the use of sub-optimal components in one case or the other, or increased complexity, due to the need to replace critical optical components, such as collection objective of the image cytometer or of the microscope, often requiring additional tasks such as alignment and/or focusing.

In one embodiment of the invention, the method for the depicting of at least one biological particle or object in a sample in suspension or adhering to a surface of a sample compartment can further comprise,

- placing the sample compartment in an image cytometer,
- illuminating the sample with light from illumination means, where the illumination light interacts with particle(s) or object(s) of the sample,
- collecting light information from the sample,
- passing said collected light through movable modulation means
- recording one or more images of light information from the sample,
- and processing the light information in the one or more images to determine or form depiction(s) of objects(s) or particle(s) and/or element or region of the object(s) or particle(s).

Although some embodiments of the present invention are based on recording only a single image, other equally preferred embodiments are based on recording of two images, or sometimes more than two images, such as three or more recorded images. When recording two or more images compared to only one image, the conditions of the image cytometer or the microscope, preferably the position of modulation means, are substantially different.

Methods of the present invention include modulation means, where said modulation means can insert significant difference in recorded light information. Said modulation means are preferably placed along the main optical axis of the image cytometer or of the microscope, preferably at location between collection optics, e.g. objective, and the image recording means, e.g. digital camera. Most preferably the modulation means are placed between the objective and the focusing lens, i.e. in the part where the imaging light is parallel. In embodiments of the present invention said modulation means introduce alteration in light information being emitted from the sample. Such alteration is preferably quantitative, e.g. relating to intensity of light information or phase angle and/or qualitative, e.g. relating to change in wavelength.

Preferred embodiments of the present invention include methods where a predetermined position of said modulation means produces modulation of recorded light information that can be processed in order to produce depiction of objects. Further several preferred embodiments of the present invention include methods where two or more different predetermined positions of said modulation means produce difference in modulation of recorded light information that can be processed in order to produce depiction of objects. Preferably said modulation means is positioned in the beam of light, at predetermined position where the conditions of light is somewhat different or where said conditions are potentially different, thus reflecting said difference in the recording of images of light information. In embodiments of the present invention where the beam of light, in which modulation means is located, is parallel it is generally preferred to move or place said modulation means in a direction perpendicular to the main optical axis of the image cytometer or of the microscope, while in other embodiments, where the beam of light, or at least a part of the beam of light is not parallel it is often preferred to move or place said modulation means in a direction parallel to the main optical axis of the image cytometer or of the microscope. In embodiments where a fraction of light of said beam of light is parallel and another fraction of light deviates from parallel it is often preferred to move or place modulation in such a manner that one or more recorded image reflect property of either said parallel light or said light deviating from parallel.

In embodiments of the present invention the beam of light, in which modulation means is located, is not homogeneous with respect to at least one optical property, such as intensity, phase shift, direction, wavelength, place of origin in sample and/or object, or more generally it is preferred that modulation means can insert alteration in at least one property that is reflected in a recorded image of light information, preferably said reflected property is intensity and/or spatial position of imaged feature. Recording two or more images of light information, under conditions where modulation means insert alteration in property of light, such as by locating said modulation means at a predefined position it is preferably possible to determine difference in said two or more recorded images and preferably using said difference to depict an object in a sample. In many preferred embodiments difference in said optical property and how it is represented in a recorded image is substantially only relating to the distance from centre in the beam of light, e.g. rotationally symmetrical, while in other embodiments said difference also relates to an angular position in the beam of light.

One preferred feature of the present invention is that recording of light information images can be performed while keeping all optical components of the image cytometer or of the microscope stationary, preferably excluding said modulation means, which preferably can be moved between different predetermined position in the recording of images of light information. This is highly preferred since it allows the configuration of the image cytometer or of the microscope to be optimized for different applications, such as scatter and fluorescence determination, and maintaining such optimized configuration.

Preferred embodiments of the present invention include methods of depicting an object, such as a biological object or a part of biological object, where the depiction can be used to create and/or improve image representation of an object in a sample. Such depiction preferably offering similar conditions of image representations as do methods such as DIC, but at the same time include the need to insert and/or move a modulation device, preferably where other components of the image cytometer or of the microscope, including collection object and focusing lens, are stationary and preferably in arrangement that is substantially optimal for other methods of image cytometry, such as fluorescent image cytometry, or of microscopy, such as fluorescent microscopy.

Several embodiments of the present invention use depicting of objects, such as biological objects, to determine masking. Preferably such masking includes determination of object boundary, such as cell boundary, such as extent or location of cell membrane. In other equally preferred methods of masking the position of elements or segments of objects, such as position of elements or segments of biological objects, within the boundary of said objects.

Several embodiments of the present invention use depicting of objects, such as biological objects, to determine focus or position of objects. Position of objects, such as biological object, is preferably relative to the focus plane of the image cytometer or of the microscope, sample compartment, or another object. The position of individual objects relative to the focus plane is often of great importance, for instance since it can be used determine the general condition of focus, e.g. to determine if the image cytometer or the microscope is "in focus", while it also can be used to determine the arrangement of the sample compartment relative to the focus plane, e.g. to determine tilting of sample compartment. In several preferred embodiments of the present invention the information concerning focus includes both amplitude, i.e. the distance from focus plane, but also concerns orientation, i.e. on which side of the focus plane it originates, and often embodiments of the present invention include the use of this information alone to determine change in arrangement of one or more optical component, e.g. a lens, sample compartment or an image recording camera, in order to bring the image cytometer or the microscope "in-focus", or at least preferably to improve the focus condition of the image cytometer or the microscope.

Depiction of objects used for determination of focus and/or position of objects are preferably based on determining shift of light information in one or more recorded images of light information, said shift produced by modulation means, preferably by movable modulation means that are in different predetermined positions during the recording of an image of light information. Further said modulation means has one or more regions that are substantially opaque, as well as having at least one region that is substantially transparent, preferably where extension, e.g. diameter, of said transparent region is less than the extension of the light beam generated by the collection objective of the image cytometer or of the microscope, thus forming an aperture. It has been found that moving said aperture relative to the centre of said light beam will produce movement of the image of the object on the image plane and said movement can be related to focus or position by processing recorded image(s) of light information.

Other equally preferred embodiments of the present invention use depicting of objects, such as biological objects, parts or segments of biological objects, to determine the position of said objects, often relative to a reference position, such as boundary of a sample compartment, or relative to other objects or parts of objects. Such methods make it possible to determine relative position of elements of an object, not only in the pane of the image, but preferably also in a direction perpendicular to the plane of the image, thus facilitating the determination of difference between particles or objects of particle in three-dimensions, e.g. for the purpose of determining location of different elements of a cell.

One preferred method for depiction of objects, such as biological objects, e.g. biological cells, is depiction of properties relating to the extent of phase shift, e.g. change in phase angle, of light, interacting with said objects. Depiction of phase shift can preferably be used to determine physical thickness and/or optical thickness of the material, such as biological object.

Preferred methods of the present invention include recording of two or more images of light information, under substantially different conditions. Preferably said difference in conditions is caused by modulation means, i.e. light modulation means, preferably where the modulation means are movable and are located in different positions during the recording of two or more said images. Preferably said modulation means modulate light information passing through and/or interacting with and/or emitted from objects in the sample. Such modulation of light is preferably one or more of the following, shift in phase angle, attenuation of light, diffraction of light, refraction of light.

Although several different types of objects can be depicted using method of the present invention, several preferred embodiments include objects that are biological objects.

While embodiments of the present invention usually are applicable to light information of any wavelength, several preferred embodiments of the present invention, in particular embodiments including depiction of biological objects, preferably include light information where illumination means are a source of light emitted in the range between 200 nm and 1,000 nm, preferably in the range between 250 nm and 800 nm, more preferably in the range between 300 nm and 700 nm. In embodiments, such as embodiments where said modulation means reflect changes in phase angle, said illumination means are preferably a source of light emitted in the range between 250 nm and 400 nm.

In several preferred embodiments the illumination means are located on the main optical axis connecting the sample and the detector of the image cytometer or of the microscope. In other equally preferred embodiments said illumination means illuminate the sample at an inclination relative to the main optical axis of the image cytometer or of the microscope, preferably where it is of interest to suppress as much of the illumination light in the recording of light information, by reducing the amount of illumination light that can enter the collection optics, i.e. collection objective.

When considering method of interaction between illuminated light and object in a sample several preferred embodiments of the present invention use one or more of the following, transmission, absorption, refraction, diffraction, Mie scatter, Raleigh scatter, Raman scatter, photoluminescence.

The modulation means in several preferred methods for depicting objects according to the present invention are modulating means that substantially affect phase of light, preferably where said movable modulating means are in an arrangement where phase shifts in light from the sample is converted to brightness changes in the image. Modulating means that produce said phase shift comprise two or more regions or zones where thickness defines phase angle shift. When recording two or more images of light information it is often preferred that at least one of said recorded images is a phase-contrast microscopy image, preferably where phase shifts of light are converted to brightness changes. Further in several preferred methods said modulation means comprises an opaque region or zone, that can substantially block light from being transmitted through said regions or zones, while another region or zone are substantially transparent. Preferably said modulation means are in different positions during recording of two or more images of light intensity information, typically said modulation means are moved in a direction perpendicular to the main optical axis between the recording of said images, preferably where the movement is predetermined.

Many preferred configurations of said modulating means are a sheet of parallel optical material, preferably optical glass and further where said sheet has different optical properties in different regions.

Preferably when said modulating means comprise a region of different optical property said region can be positioned approximately in central alignment with the main optical axis of the image cytometer or of the microscope, and in many embodiments the region is symmetrical, more preferably where the region is circular. Many such preferred embodiments include methods where said modulation means are moved relative to the centre of the main optical axis.

An often-preferred property of a modulation means is where regions of said modulation means have different transparency of light, such as different attenuation of light. Preferably said modulation means has regions of different attenuation, preferably where attenuation of some region(s) is strong, often where said region(s) is/are substantially opaque, and/or where other region(s) have little attenuation, often where said region(s) is/are transparent. Other preferred embodiments include region(s) of transparency were attenuation varies across the extension of said region(s), for instance when attenuation is continuously varying along a dimension of said region(s), such as when attenuation of region(s) is apodised.

In several embodiments of the present invention depiction of object, such as a biological object, is based on inserting first modulation means into the beam of light, while in other embodiments said depiction is based on placement of said first modulation means at predetermined position in the beam of light. In other embodiments of the present invention said depiction is based on insertion of a second modulation means, preferably where said second modulation means differ in property relative to said first modulation means. Often difference between first and second modulation means is relating to spatial arrangement of optically active region(s) or section(s), while other embodiments include regions(s) or section(s) that present different optical modulation in said first and second modulation means.

When performing methods according to the present invention, including methods such as phase-contrast methods, it is generally preferred that illumination means illuminates the sample with light that is substantially collimated, as it enters the sample. In other methods, including methods such as scatter, side-scatter and fluorescence, it is equally preferred that illumination means illuminates the sample with light that is not collimated, i.e. substantially focused onto the sample. In either case, often depending on the application.

Preferred methods of the present invention include methods of processing recorded images of light information such as, scaling of images, addition of images, subtraction of images, ratio between images, cross-correlation between images, deconvolution of images, retrieval of optical phase and intensity through solving the transport of intensity equation. Further methods such as determination of position through localization of maximum-signal-intensity and/or localization of centre-of-mass of intensity are often preferred, in particular when depiction concerns determination of focus and/or position.

Several embodiments of the present invention include recording images of light information, where light information is fluorescent light information or side-scattered light information.

Several preferred methods of the present invention concern depiction of an object adhering to a surface, preferably adhering to a surface of the sample compartment. Preferably said objects are biological objects, such as cells, growing on a surface.

Preferred implementations of the present invention include methods for masking elements or regions of biological objects, where element or region of biological object is the boundary of the object or the cell membrane. Equally preferred are implementations where elements or regions of biological object are contained within the boundary of the object. Many tasks of image cytometry or microscopy include analysis of the nucleus of biological objects and in such tasks it is preferred to include implementations of present invention where element or region of biological object is the region of the object that contains its nucleus. Other tasks of image cytometry or microscopy include analysis of other parts of biological objects and in such implementations of the present invention, an element or region of biological object is the cytoplasm, mitochondria, golgi apparatus, lysosome, endoplasmic reticulum, vacuole, chloroplasts, flagellum, nucleolus, stress granule, cytoskeleton, centrosome, cell wall, cell membrane, nuclear membrane, foci comprising biomolecules or in general any element or region of a biological object.

Analysis of properties of biological objects and/or samples of biological objects preferably includes features of the present invention. Several of such analyses concern individual objects, such as analysis of status of cell cycle, cell viability or cell vitality, just to mention a few. In these cases it is of interest to locate one or more elements or parts of a cell, such as its nucleus, mitochondria, or other parts that are involved in cell metabolism.

Several image cytometry or microscopy tasks including masking based on implementation of the present invention include estimate of size of an object or a region of an object, such as observed diameter and/or circumference of the object or a region of the object. Further such tasks often include preferred implementation of masking for the estimate of cell concentration in a sample of biological objects.

In image cytometry or microscopy light information from a view of the sample is recorded for the purpose of analysis and preferably information from two or more views of different parts or volume the same sample are recorded, thereby increasing the area and/or volume of the sample that is analyzed. Several of the methods of masking according to the present invention can be used for the task of estimating number of objects in a view of the image cytometer or of the microscope, preferably where the number of objects present in two or more views are estimated. In several tasks of image cytometry or microscopy the property of interest is the determination of intensity of light information, preferably fluorescent light information, from an object and/or an element or a part of an object where implementation of the present invention allow reliable masking of such objects and/or elements or regions of such objects.

It has been found that several embodiments of the present invention are suitable for analysis of biological objects such as plant, fungi or bacteria cells and animal cells, including mammalian, bird, reptile, amphibian, fish and insect cells. Depending on the nature of the sample and/or the purpose of the analysis, conditions of the cells can vary. Implementations of the present invention have been found to be useful for the analysis of biological objects adhering to a surface, such as samples where cells are growing on a substrate, such as a surface of a sample compartment. Such analysis is often of interest when the cells in question have tendency to form a colony on a substrate of some sort. In order to investigate such biological objects, implementations of the present invention allow samples containing adherent cells to be analyzed directly, without first releasing such cells into solution, preferably by allowing the sample, containing the substrate to which the biological object adhere, to be viewed in the image cytometer or in the microscope, using preferred embodiments of the present invention to mask out adherent biological objects and/or element or region of adherent biological object.

In other embodiments of the present invention, cells in suspension are subjected to analysis. In such analysis of cells in suspension, especially when each view of the sample is investigated for a prolonged time, or in particular when it should be possible to revisit a given view of a sample it is preferred that the cells have sedimented prior to analysis, at least such that objects are in close proximity to a surface of the sample compartment prior to analysis. Time of such sedimentation process varies depending on the properties of the sample being analyzed, properties such as viscosity, object size and density are of greatest importance, but also on the properties of the sample compartment used.

Many highly preferred embodiments of the present invention use as a light source Light Emitting Diode (LED). In several of these embodiments two or more Light Emitting Diodes (LEDs) are preferred, which often offers advantages such as the ability to increase intensity of illuminated light by using two or more LEDs emitting light in substantially the same wavelength band and/or the ability to illuminate the sample with light of two or substantially different wavelength bands by using two or more LEDs emitting light in substantially different wavelength band.

When implementing embodiments of the present inventions in image cytometry or in microscopy it is often preferred to have high optical magnification, namely since such conditions favour large imaging of small details but also allow the use of large numerical aperture of the optical system, thus facilitating collection of large amount of light. On the other hand high optical magnification inherently limits the field of view of the image cytometer or of the microscope, thus limiting the volume or area of the sample that is recorded in a single view. Therefore several preferred embodiments of the present invention include implementation of moderate optical magnification such as optical magnification below ×100 and in some situation optical magnification below ×60, typically when detailed information concerning size and/or morphology of biological objects and/or elements or parts of biological objects is of interest. Further in other embodiments optical magnification such as optical magnification of ×20 or below is of interest. This is typically of interest when objects under analysis are sufficiently large to allow detailed image representation and/or when it is of interest to image large portion of the sample in each sub-sample image, such as when it is of interest to limit the number of sub-sample images of different sections of the sample while still analyzing the entire sample or at least a substantial fraction of the sample.

Since low optical magnification reduces the ability to resolve small features in the image of a biological object in several preferred embodiments of the present invention it is preferred that optical magnification is in the range between ×100 and ×2, such as in the range between ×20 and ×4. In yet other embodiments, typically where small features of biological objects are of less interest it is preferred that optical magnification is ×10 or less, preferably where optical magnification is ×5 or less. In particular when it is of interest that large volume and/or large area of the sample are represented in the field of view of the image cytometer or of the microscope several embodiments of the present invention include implementations where optical magnification is ×4 or less, in several embodiments a very low optical magnification is preferred such as optical magnification of ×2 or less.

BRIEF DESCRIPTION OF TH DRAWINGS

EXAMPLE 1

Imaging Conditions

Figure 1:
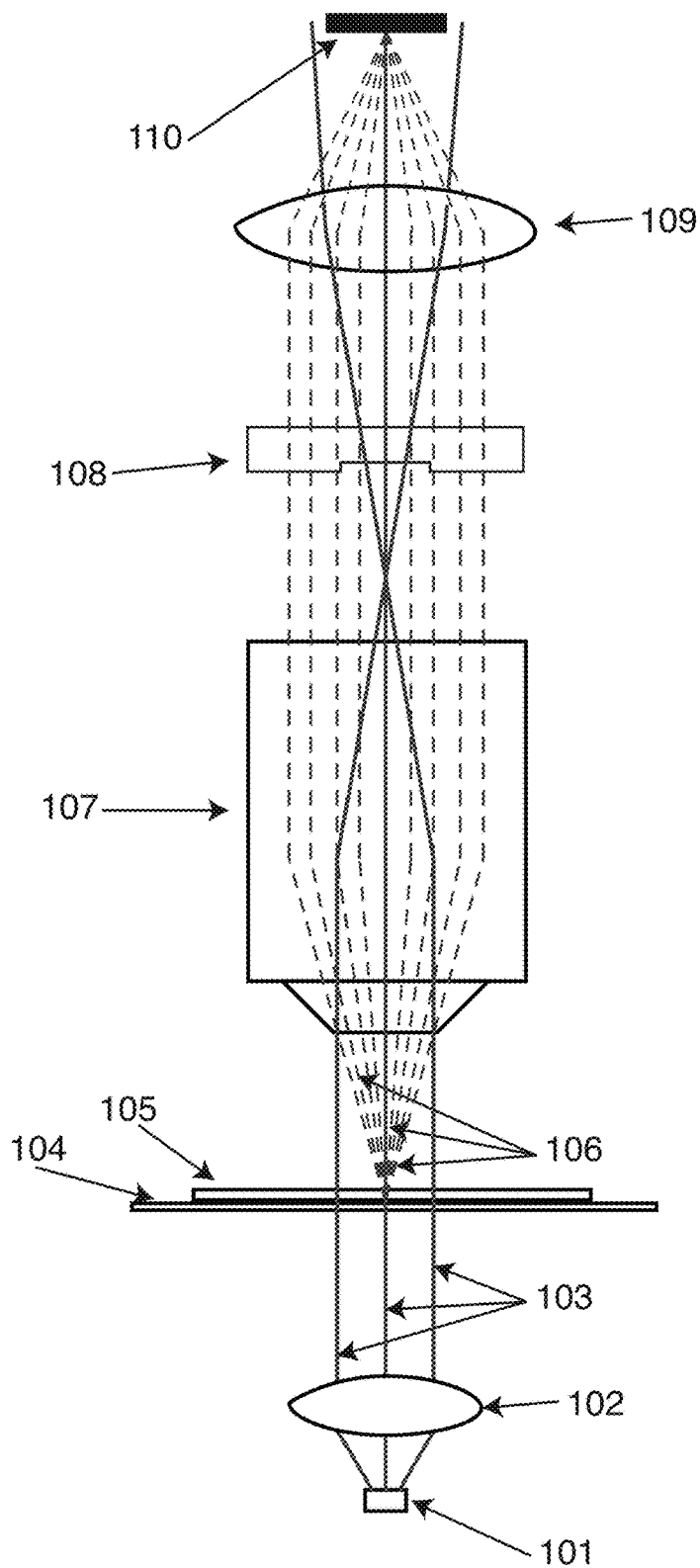
FIG. 1 illustrates image cytometer arrangements according to the present invention.
Figure 1:
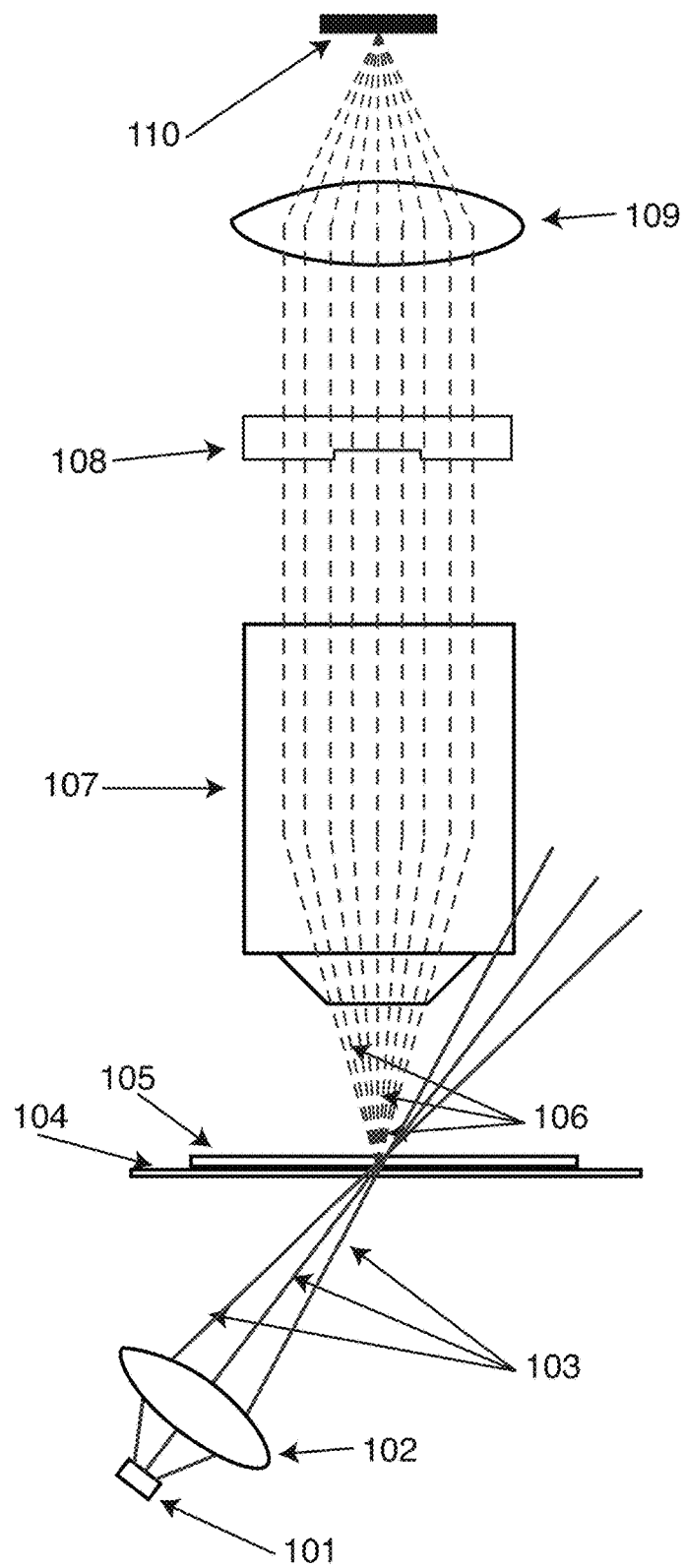
Figure 1:
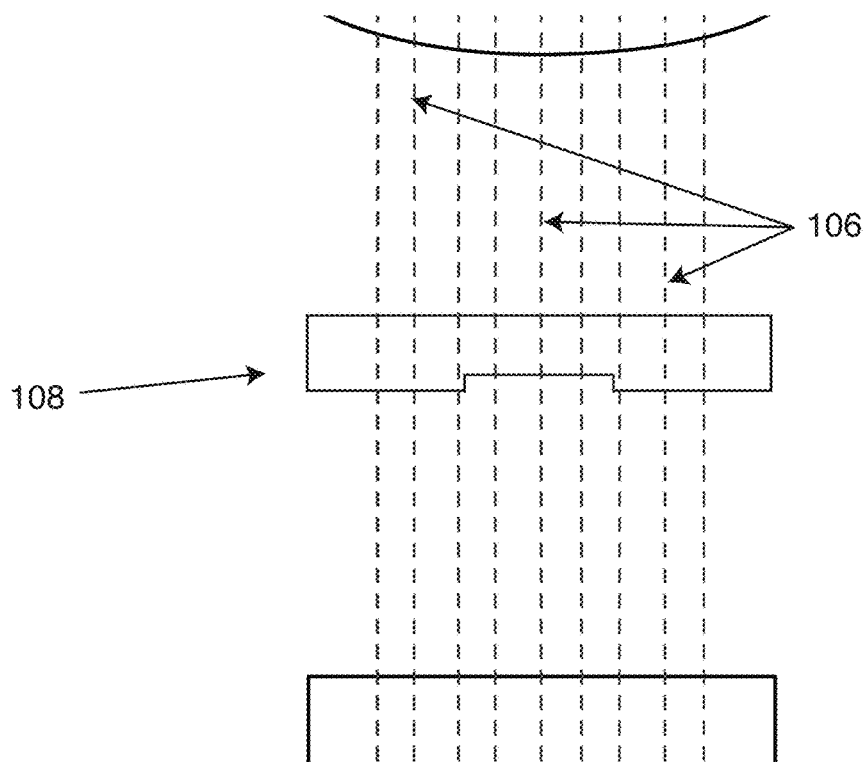
Figure 1:
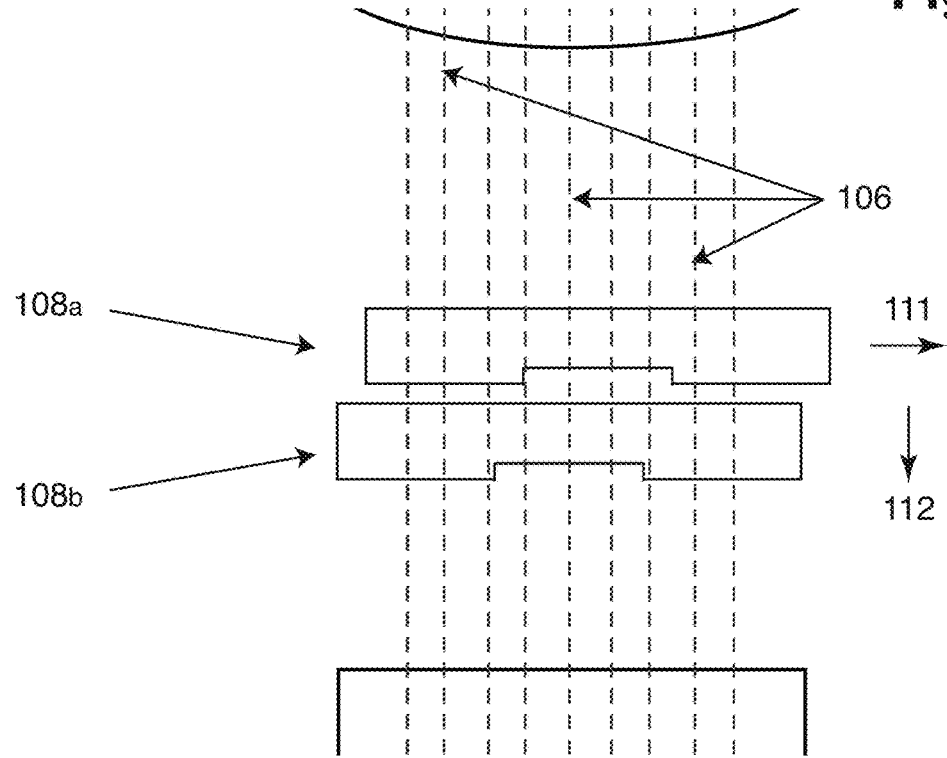

An Image Cytometer according to present invention, generally suitable for detection of phase-shift of light, is schematically illustrated in FIGS. 1A, 1B, 1C and 1D. The sample is illuminated by a light source (101) emitting light in a direction substantially parallel to the main optical axis in FIG. 1A. However, in FIG. 1B the sample is illuminated by a light source (101) emitting light at an inclination to the main optical axis. The illumination light is passed through optical means (102), such that it forms a beam of light (103) which either is substantially collimated or focused on the sample compartment, depending on the nature of the arrangement of the image cytometer.

A holder for the sample (104) supports the sample compartment (105) containing the sample being analyzed. When the beam of illumination light enters the sample, usually majority of it passes through the sample without any interaction with the sample or particles or objects in the sample, such as when the illumination light passes through transparent liquid. A part of the illumination light interacts with particles or objects in the sample, which can give rise to emitted light (106), either formed through changes in the direction of the light, e.g. through scatter, or formed through photoluminescence. The direction of emitted light is generally largely different from the direction of illuminated light, which means as the light leaving the sample, e.g. emitted light or combination of transmitted illumination light and emitted light, enters the objective module (107) of the image cytometer they are processed differently. In several preferred embodiments emitted light leaves the objective module as a parallel beam of light.

The emitted light leaving the objective module interacts with the modulation means (108) before being focused by a lens module (109) onto the image recording means (110).

The schematic illustration of an image cytometer according to several embodiments of the present invention, where illumination light (103) enters the sample at an inclination relative to the main optical axis, is given in FIG. 1B. Such configuration of image cytometer is typically preferred when performing photoluminescence analysis or side-scatter analysis. Some preferred properties of such embodiments relate to that majority of the illumination light is directed outside the entry of the objective module (107) and are thus substantially not directed towards the detector. The illumination light schematically illustrated in FIG. 1A is substantially collimated, while it is obvious that several of the preferred embodiments of the present invention include illumination light that is focused onto the sample region.

FIG. 1C is a detailed illustration of the modulation means (108). In this illustration the modulation means is of a design that can be suitable for phase-contrast determination, containing a centre-region that has different thickness than the rest of the modulation mean. The difference in thickness causes phase-shift difference in the light passing through the different regions of the modulation means. It is obvious that other equally preferred embodiments of the present invention could comprise modulation means that modulate light in a different manner.

FIG. 1D is an illustration of the modulation means in FIG. 1C, where the modulation means is in different position, such that it is has been moved in a direction perpendicular to the main optical axis (108a), by a given amount (111). The figure illustrates that different portion of the parallel emitted light (106) enters the phase-shift regions of the modulation mean. Also the figure illustrates that the modulation means has been moved in a direction along the main optical axis (108b), by a given amount (112). The movement of the modulation means can be either in the direction perpendicular to the optical axis, or in the direction along the main optical axis, or in both directions at the same time.

EXAMPLE 2

Modulation Means

Figure 2:
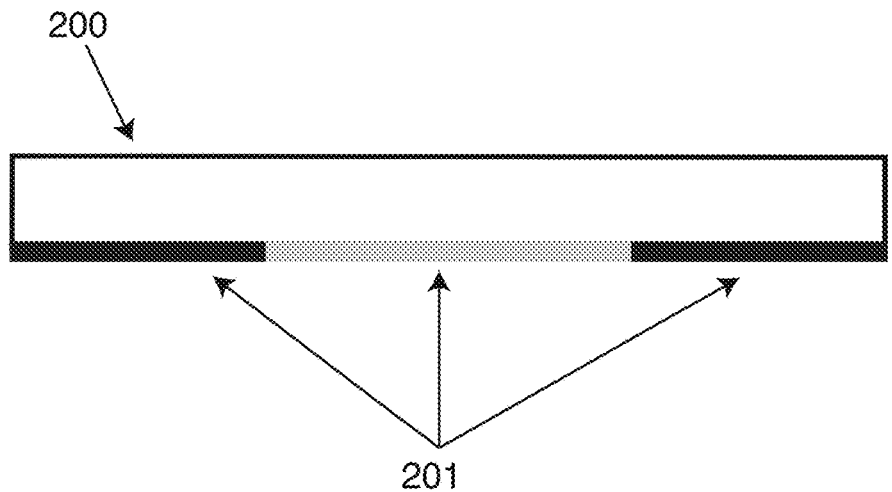
FIG. 2 illustrates modulation means in configurations according to the present invention.
Figure 2:
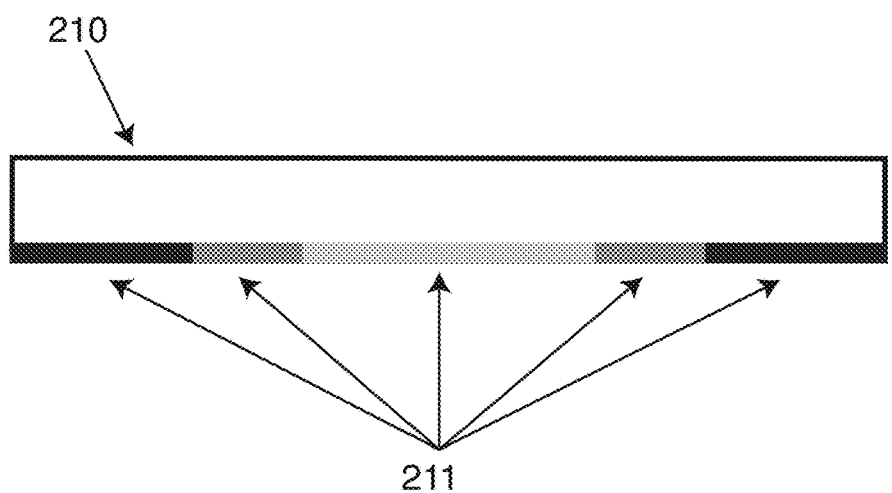
Figure 2:
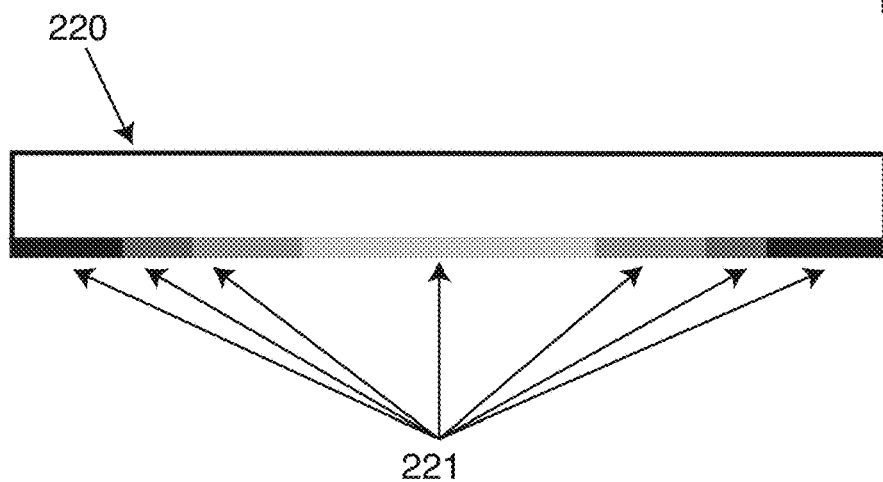
Figure 2:
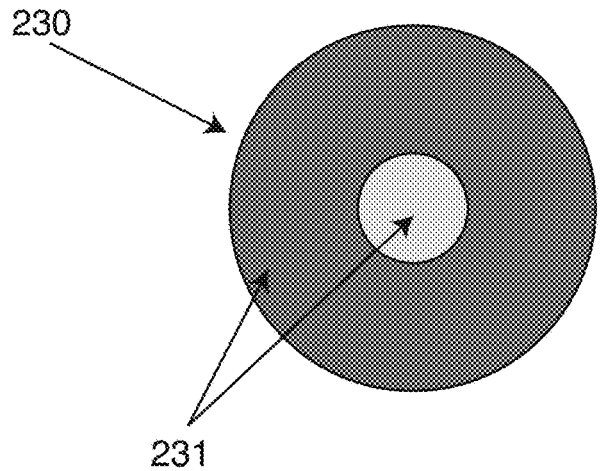
Figure 2:
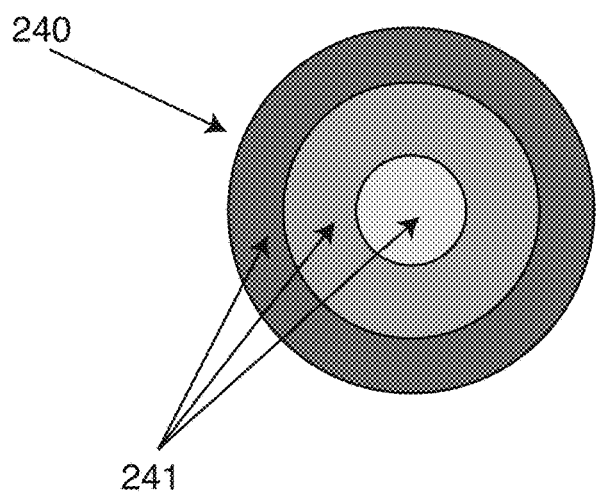
Figure 2:
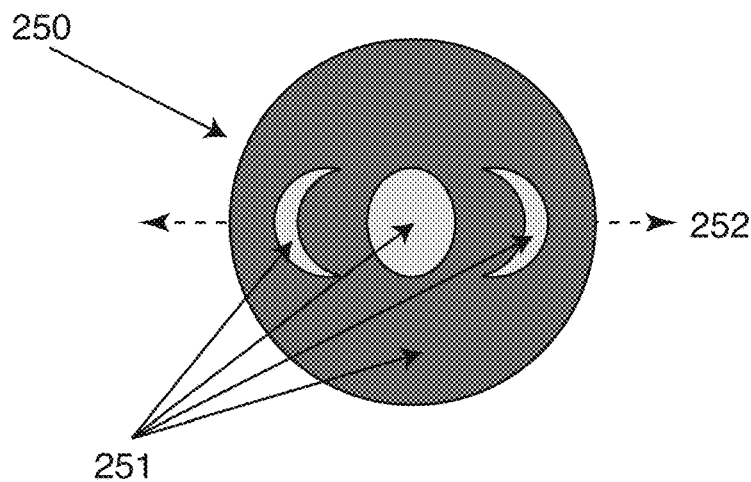
Figure 2:
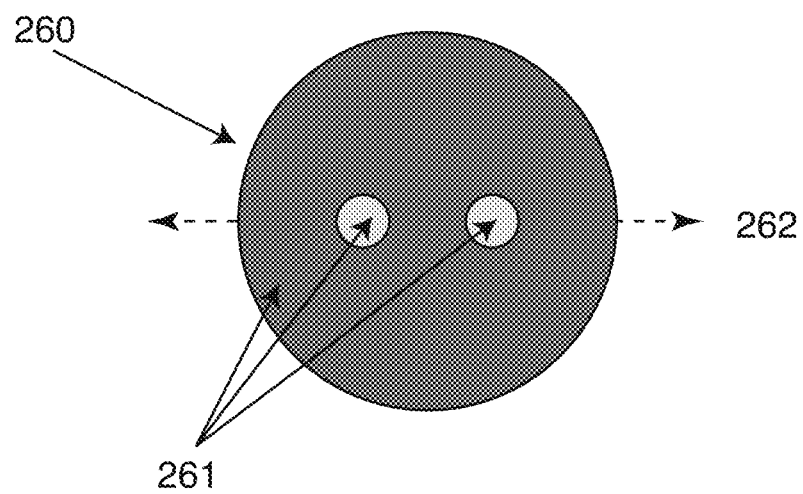
Figure 2:
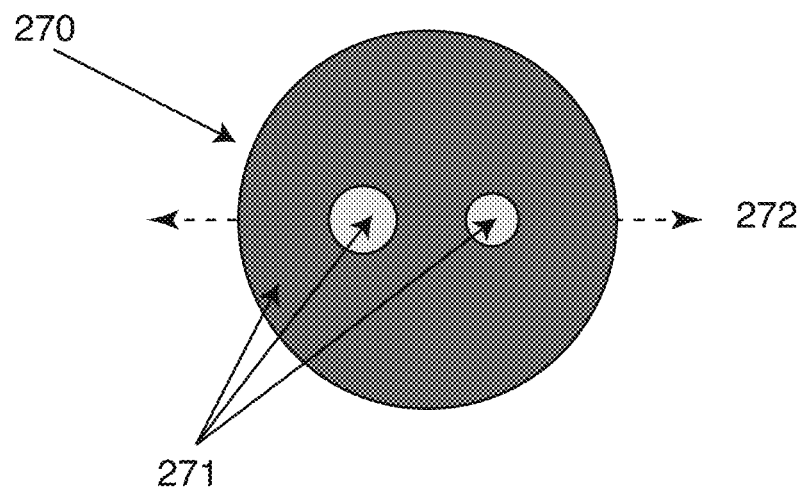

FIG. 2 presents schematic illustrations of modulation means, usually preferred in embodiments of the present invention. The nature of the modulation produced by the modulation means is usually preferred to be such as phase-shift or attenuation of light. The schematic illustration of FIGS. 2A, 2B and 2C present a cross-section of modulation means but do not disclose detailed mechanical design of the modulation means. Generally, modulation means of circular, square or rectangular shape are preferred in embodiments of the present invention.

FIG. 2A illustrates modulations means as a solid block (200), through which it is assumed that light traverses, the modulation means comprising along its diagonal line three different regions of modulation (201) presented as bars of different shade along one edge of the modulation mean.

Similarly FIG. 2B illustrates modulation means (210) comprising along its diagonal line five different regions of modulation (211). Further FIG. 2C illustrates modulation means (220) comprising along its diagonal line seven different regions of modulation (221).

Further FIG. 2D illustrates top view of modulation means (230), with similar cross-section as the modulation means presented in FIG. 2A. The modulation means comprises 2 modulation regions (231), a first symmetrical centre region enclosed by a second region. The presented shape of the modulation means is circular, but this relates to the typical shape of the ray of light passing the modulation means rather than its physical shape. When a modulation means of this design is inserted in the centre of the beam of light, typically light emitted from an object at small angle relative to the main optical axis of the image cytometer, pass in the central region of the modulation means, while light emitted at greater angle, pass the enclosing region.

Similarly FIG. 2E illustrates top view of modulation means (240), with similar cross-section as the modulation means presented in FIG. 2B. The modulation means comprises 3 modulation regions (241), a first symmetrical centre region enclosed by further 2 regions. FIG. 2F illustrates top view of modulation means (250), with similar cross-section as the modulation means presented in FIG. 2C. The modulation means comprises 4 modulation regions (251), a first elliptical centre region and further 2 crescent regions in linear alignment with the centre region and finally a forth region enclosing the former. The elliptical shape of the central region serves to illustrate that shapes other than circular shapes are often preferred, as do the 2 crescent regions. Since the regions of the modulation means is not rotationally symmetrical it is generally preferred that movement, between the recording of two images, is preferably along an axis (252) connecting individual modulation means regions. Designs with repeated zones enhances the differential phase effects increasing contrast.

FIG. 2G illustrates modulation means that comprises 3 modulation regions, two regions aligned with a cross section of the modulation means and a third region enclosing the former regions. Since the regions of the modulation means is not rotationally symmetrical it is generally preferred that movement, between the recording of two images, is preferably along an axis (262) connecting individual modulation means regions.

FIG. 2H illustrate modulation means (270), similar to those in FIG. 2G, with the main difference that one of the two of the regions (271), which are aligned with a cross section of the modulation means have different size, e.g. such that one of them is about 2 times that of the other. Often similar effect can be obtained by having property of the two regions differ, such as with respect to attenuation of light, preferably the net effect being that intensity of light transmitted through the two regions is substantially different. Since the regions of the modulation means is not rotationally symmetrical it is generally preferred that movement, between the recording of two images, is preferably along an axis (272) connecting individual modulation means regions.

Although few general designs of modulation means are present in the present example is to be understood that these designs do not present a limiting number of possible designs. In fact, although many preferred embodiments of the invention indeed comprise modulation means that are similar to the ones presented, other equally preferred embodiments comprise modulation means of substantially different design.

EXAMPLE 3

Visualization

An image cytometer system according to the present invention was constructed, with a light source using Light Emitting Diode (LED) emitting light centred at about 365 nm in wavelength, arranged in alignment with the main optical axis of an image cytometer. The light illuminating the sample compartment was substantially collimated and homogenized, with respect to spatial intensity, using a lens system. The sample compartment comprised of two transparent glass wall parts, with U2OS cells growing on the bottom surface, forming a layer of adherent cells. The cell where fixed with formaldehyde and lysed with a solution containing Triton X-100. Prior to analysis the sample had been stained using a solution of DAPI, which since the cells had been lysed is expected to stain the nucleuses of the cells.

Light emitted from the sample was collected using a Nikon 4× objective (NA 0.2), forming a near parallel beam of light. The beam of light was focused, using a Nikon f-200 mm lens, onto a Point Grey CCD digital camera used to record the image.

Into the substantially parallel beam of light formed by the objective a phase plate was inserted as modulation means. The phase plate was a fused silica plate with circular phase section, 5 mm in diameter and approximately 192 nm in depth. The phase plate was mounted on means that could move it laterally, relatively to other components of the image cytometer, thus forming a movable modulation means.

Figure 3:
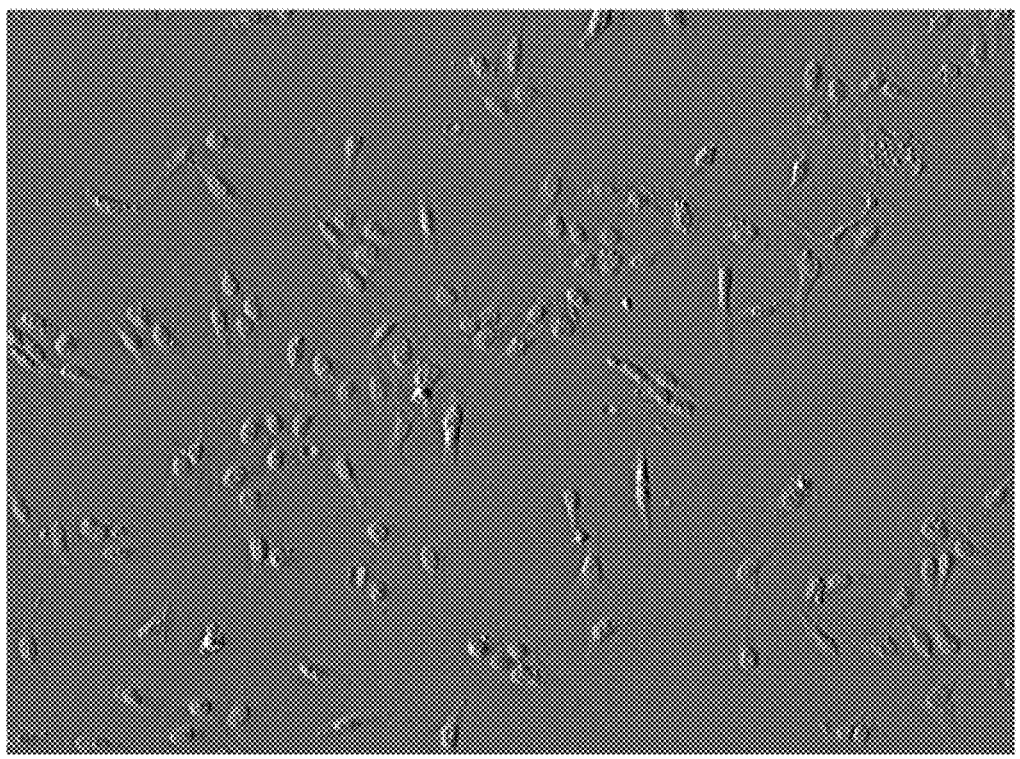
FIG. 3 illustrates depiction of visualization of adherent cells according to the present invention.
Figure 3:
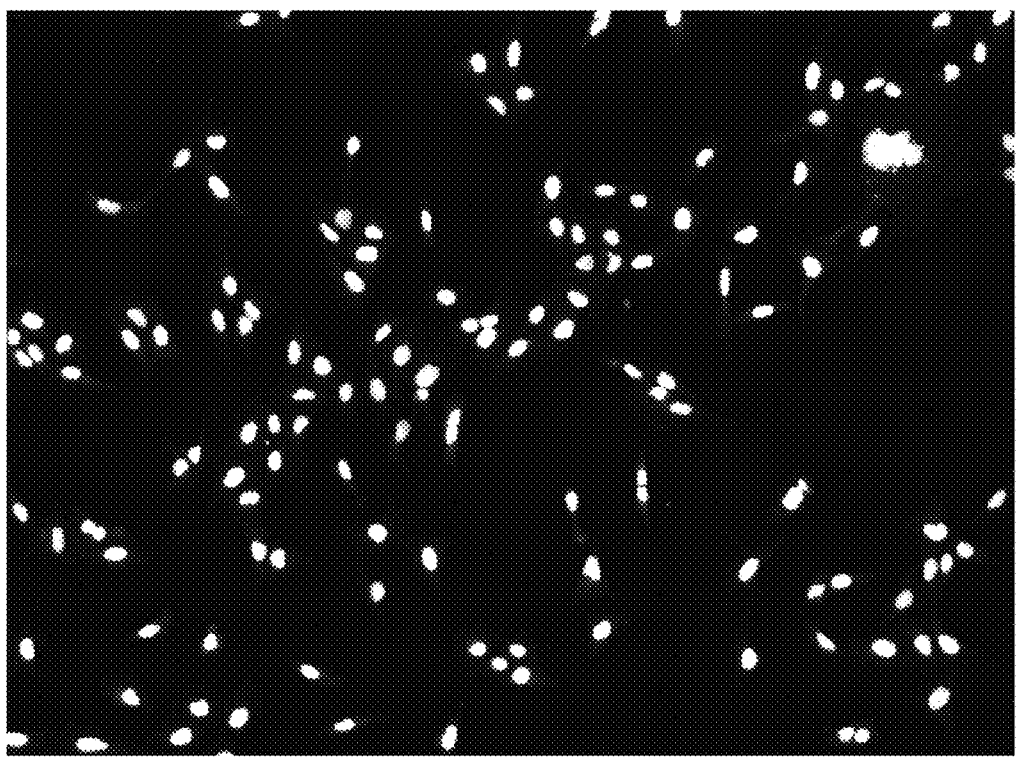

FIG. 3A shows a difference phase-contrast image of the sample, as generated by preferred methods of the present invention. The image visualizes several cells, firstly it visualizes the nuclei of cells as compact structure but also the boundary of the adherent cells is clearly visible.

The modulation means were detracted and in its place a fluorescence emission filter, suitable for selecting a waveband reflecting fluorescence from DAP, was inserted. The fluorescence image that was recorded is presented in FIG. 3B. The fluorescence signal can be contributed to the nuclei of the cells, which can be verified by comparing position shape and size to the nuclei parts of FIG. 3A.

The results of the analysis show that it is possible, using preferred embodiments of the present invention, to generate a depiction of mammalian cells in a sample, under conditions where individual cells becomes clearly visible, and further, without any alteration other than replacing modulation means with fluorescence emission filter, it shows that it is possible to record a fluorescence image, where both the depiction and the fluorescence image are captured under substantially optimal conditions.

EXAMPLE 4

Focus and Position

A image cytometer system according to the present invention was constructed, with a light source using Light Emitting Diode (LED) emitting light centred at about 405 nm in wavelength, focused in a manner that approximately the field of view of the image cytometer was illuminated with substantially uniform light intensity, configured for the recording of images of fluorescence light information. The light source was arranged in alignment with inclination to the main optical axis of an image cytometer, such that majority of the light from the light source did not enter the collection optics in order to reduce stray-light.

Fluorescent light emitted from the sample was collected using a Nikon 4× objective (NA 0.2), forming a near parallel beam of light. The beam of light was focused, using a Nikon f-200 mm lens, onto a Point Grey CCD digital camera used to record the image.

Into the parallel beam of light formed by the objective, the modulation means was inserted. The modulation means was an opaque disk containing a circular aperture, approximately 7 mm in diameter. The aperture disk was mounted on means that could move laterally, relatively to other components of the image cytometer, thus forming a movable modulation means.

In a first experiment the sample compartment comprised of two transparent glass wall parts with about 100 μm spacing, was loaded with a suspension of Jurkat cells. The cell where lysed with a solution containing Triton X-100 and stained using a solution of DAPI, which since the cells had been lysed is expected to stain the nucleuses of the cells. The sample was allowed to rest for adequate time to allow substantially all of the suspended cells to precipitate onto the bottom surface of the sample compartment, thus assuring that virtually all cell objects are at stand-still during analysis. Two images of fluorescent light information from the sample were recorded, where for the first image the centre of the aperture was displaced approximately 5 mm from the centre of the beam of light, and for the second image the centre of the aperture was displaced approximately 5 mm from the centre of the beam of light but on the opposite side of the centre of light beam, relative to the position used for the first image.

In each of the two recorded images fluorescent objects were identified and the position of each object, expressed as rows and columns of pixels, was estimated using the position of centre-of-gravity, with respect to fluorescence intensity for each fluorescent object. Using position of each object in the first image as reference, the difference in the row and column position of the corresponding object in the second image was determined, thus estimating the shift in position of each object in the two recorded images.

Figure 4:
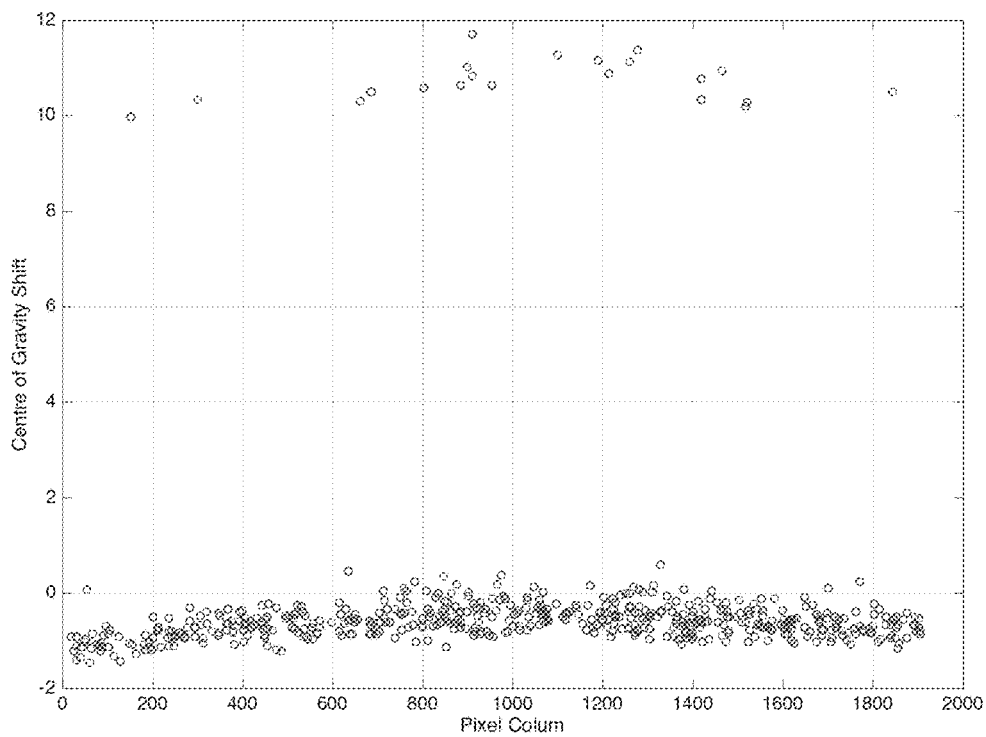
FIG. 4 illustrates depiction of focus and position of biological objects according to the present invention.
Figure 4:
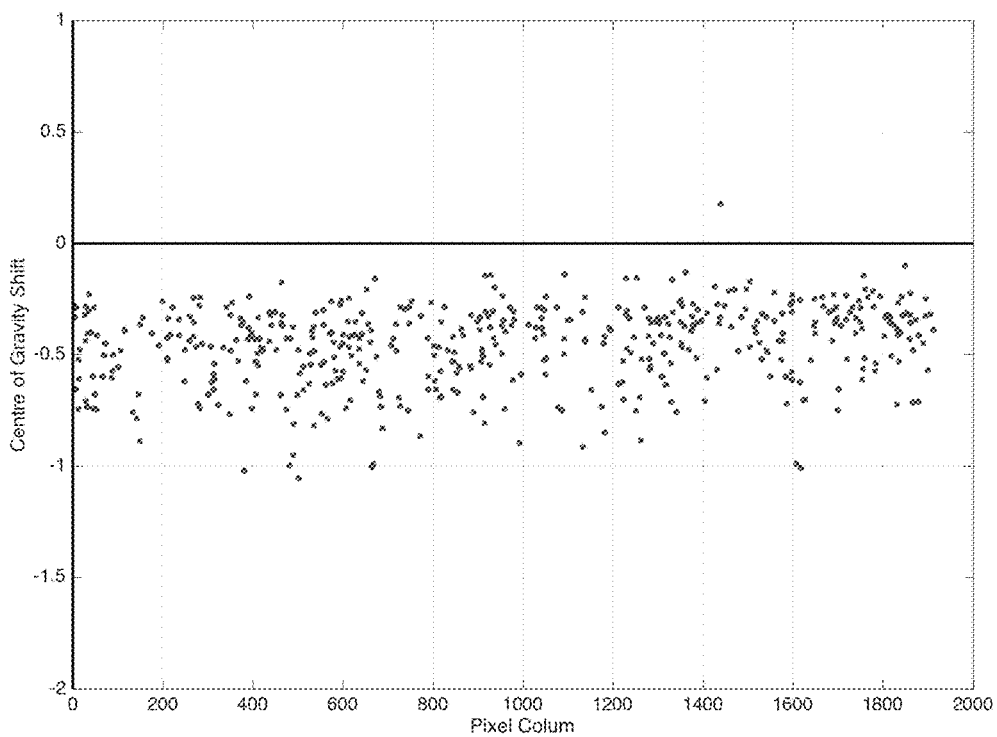

FIG. 4A shows a plot of centre-of-gravity shift of objects, versus image column-position of the object. The plot shows two distinct populations of cells substantially parallel with x-axis of column-position, a first population centred around shift of about zero pixels, an average shift of approximately −1 pixel, and a second population centred around about shift of about +11 pixels. Knowledge of the system, such as pixel size and optical magnification, makes it possible to determine that the difference in shift between the two populations amounts to about 100 μm and manual inspection of the recorded images confirms that objects in the second population are indeed objects that adhere to the top surface of the sample compartment, while objects that are located at or close to the bottom surface of the sample compartment are members of the first population. Further the average shift of the first population can be related to the position of the focal plane of the image cytometer performing the analysis, suggesting that the focal plane is located slightly above the bottom surface of the image cytometer.

In a second experiment the sample compartment comprised of two transparent glass wall parts, with U2OS cells growing on the bottom surface, forming a layer of adherent cells. The cell where fixed with formaldehyde and lysed with a solution containing Triton X-100. Prior to analysis the sample had been stained using a solution of DAPI, which since the cells had been lysed is expected to stain the nucleuses of the cells. Two images of fluorescent light information from the sample were recorded, where for the first image the centre of the aperture was displaced approximately 5 mm from the centre of the beam of light, and for the second image the centre of the aperture was displaced approximately 5 mm from the centre of the beam of light but on the opposite side of the centre of light beam, relative to the position used for the first image.

In each of the two recorded images fluorescent objects were identified and the position of each object, expressed as rows and columns of pixels, was estimated using the position of centre-of-gravity, with respect to fluorescence intensity for each fluorescent object. Using position of each object in the first image as reference, the difference in the row and column position of the corresponding object in the second image was determined, thus estimating the shift in position of each object in the two recorded images.

FIG. 4B shows a plot of centre-of-gravity shift of objects, versus image column-position of the object. Using embodiments of the present invention it has been found that the magnitude of centre-of-gravity shift can be related to distance from the focal plane of the image cytometer. From that follows that variations in centre-of-gravity shift among different objects can be related to distance between said objects. Since it is known that the cells that are analyzed are adhering to the bottom surface of the sample compartment it can be concluded that variations in shift among the different cells can be related to variation in the position of the nuclei of the different cells in the z-axis of the sample compartment, thus combined with the position in x- and y-axis, derived from the x- and y-position of objects in the recorded image it is possible to depict object position in x-y- and z-coordinates. Further analysis of the system deployed in the analysis demonstrates that the precision in the determination of centre-of-gravity shift is of the order of 0.05 pixels, expressed as one standard deviation, corresponding to precision of about 0.5 µm, which is substantially smaller than the dimension of the cells, or even smaller than the nuclei of the cells, suggesting that reliable and valuable information concerning z-axis position can be derived from depiction of the biological particles or objects.

The results of these findings demonstrate that using methods of the present invention it is possible to implement methods for depiction of objects, such as biological particles or objects, that allow the determination of focus and/or position of biological particles or objects, relative to the focal plane of the image cytometer and/or relative to other biological particles or objects.

EXAMPLE 5

Figure 5A:
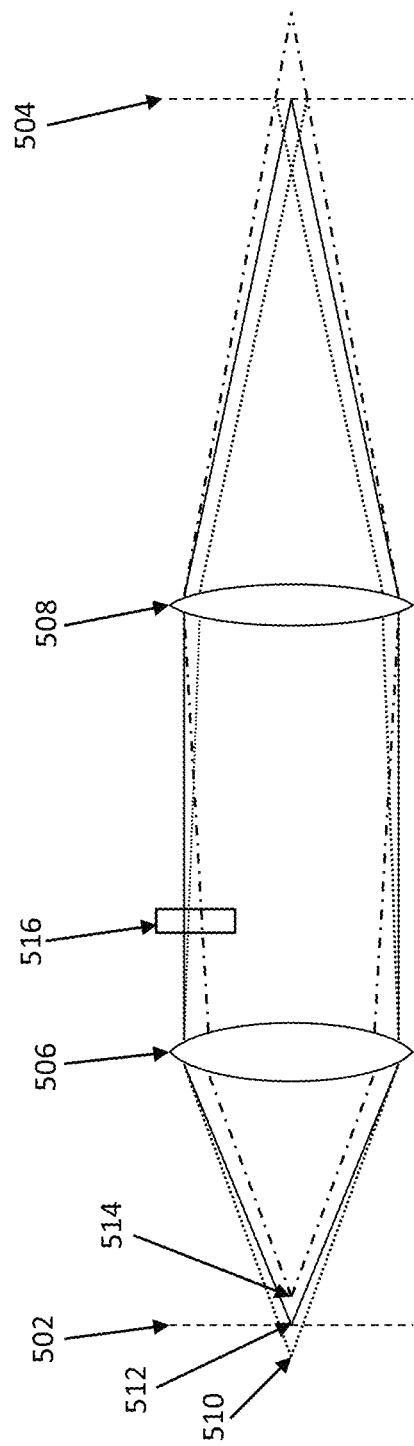
FIG. 5 illustrates relationship between position along optical axis and shift in depiction of an object on the image plane according to the present invention.

FIG. 5A shows the invention in an illustrative way. FIG. 5A shows an object plane 502 depicted on an image plane 504 by a first lens 506 and a second lens 508. There are a first object 510, a second object 512, and a third object 514 in the object plane separated along an optical direction from the object plane to the image plane. The expression optical direction is used here since if e.g. a mirror is inserted in the optical path the first part of the optical direction is the direction from the object plane to the mirror and the second part of the optical direction is the direction from the mirror to the image plane.

The second object 512 of the object plane is positioned exactly on the focal plane of the first lens 506, while the first object 510 is a little further way from and the third object 514 is a little closer to the first lens 506 than the second object 512.

The second object is depicted by the two lenses 506,508 on the image plane exactly on the focus plane of the second lens 508 (see the solid line in FIG. 5A), while the first object 510 is depicted in a point in front of the image plane 504 (see the dotted line in FIG. 5A). The third object 514 is focused by the second lens 508 into a point behind the image plane (see the dotted and dashed line in FIG. 5A).

A sensor surface like e.g. the CCD chip of a digital camera placed in the image plane will record a sharp picture of the second object, while the depiction of the first and third objects will be a little blurry on the sensor surface.

By inserting e.g. a modulation means 516 like a blocker in the optical path on one side the light from the object plane onto the image plane will be asymmetrically influenced. The depiction of the second object will only be influenced by losing some of the light intensity, while the depictions of the first and third objects will move in the image plane. By removing the upper part of the rays between the object plane and the image plane from the first object, the depiction of the first object will move upwards in the image plane and on the sensor surface, since the dotted line taking the upper path from the first object towards the image plane contributes to the lower part of the depiction of the first object. By removing this ray, the lower part of the depiction of the first object disappear and the depiction moves upwards. Likewise, but in the opposite direction, the depiction of the third object will move downwards in the image plane due to the modulation of the modulation means 516. The modulation means could also be an absorber absorbing some but not all of the light falling on the absorber.

By taking two pictures by the sensor surface, where one picture is with and one picture is without the modulation means, and subtracting the two pictures from each other, the resulting subtracted picture will have an increased contrast at the edges of the objects, where the two pictures differ. (The resulting subtracted picture may have negative intensities, which can be fixed by e.g. adding all pixels in the picture with the intensity of the pixel, which has the highest absolute value of the pixels with a negative intensity.) The increased contrast will enable the user to see the contours of the objects more clearly, as shown in e.g. FIG. 3A.

Figure 5B:
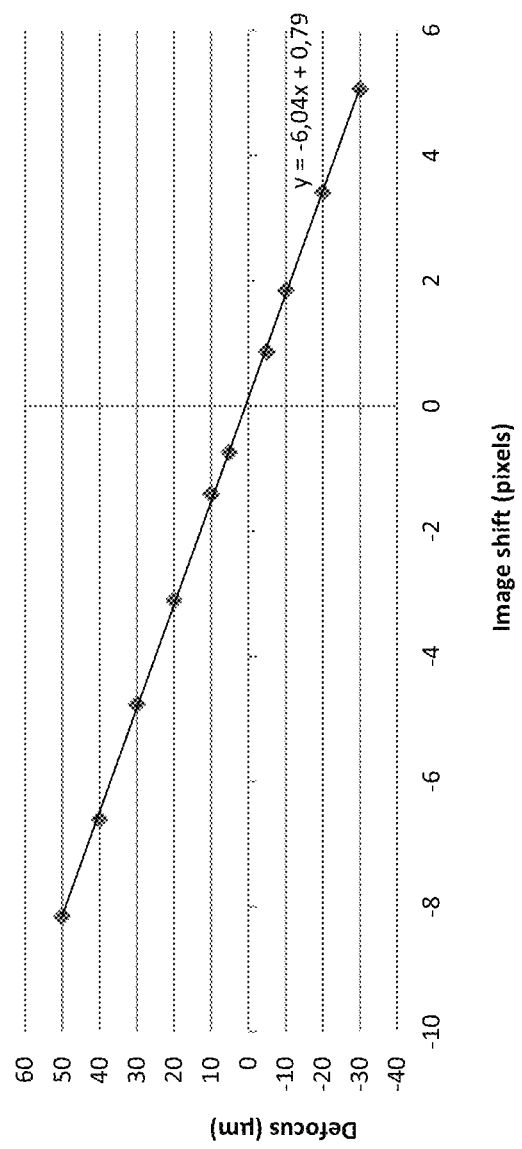

The further away from the focal plane of the first lens 506 an object is, the more the depiction of the object will move in the image plane when the modulation means is inserted. So how much the depiction is shifted depends on the distance from the focal plane of the first lens. The relationship is more or less linear as FIG. 5B shows. In addition to determining the x- and y-coordinates of the objects in the image plane, this method can determine the z-coordinate of each object. This is also shown in FIG. 4A described above, where most objects are situated close to the bottom surface of the sample compartment, while some few objects adhere to the top surface of the sample compartment. If it is essential, when performing statistics of or analyzing objects, that the objects are situated at the same level, the objects adhering to the top surface of the sample compartment can be deselected from the objects on which the statistics or analysis is based. This will give results with higher accuracy.

EXAMPLE 6

Figure 6A:
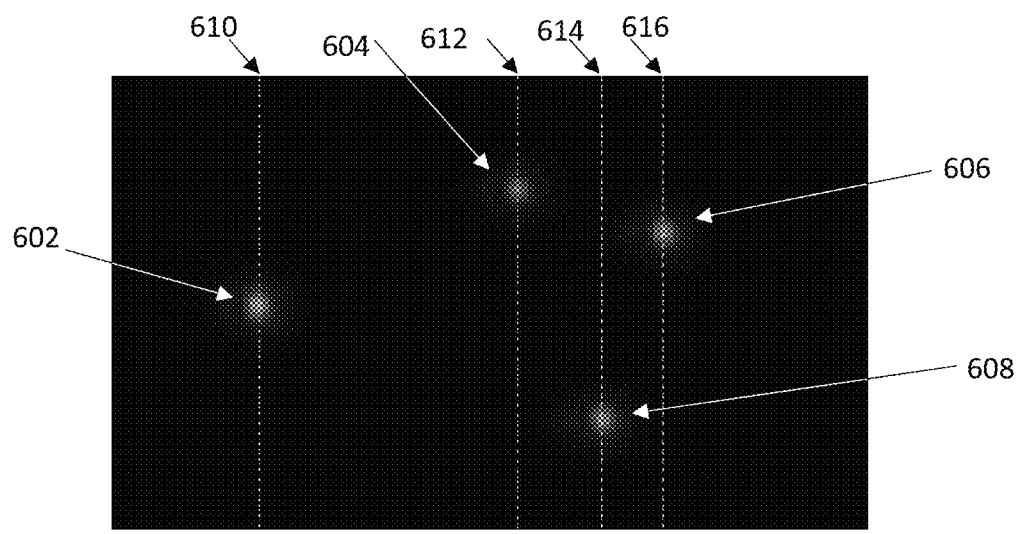
FIG. 6 illustrates shift in depiction of an object on the image plane according to the present invention.
Figure 6B:
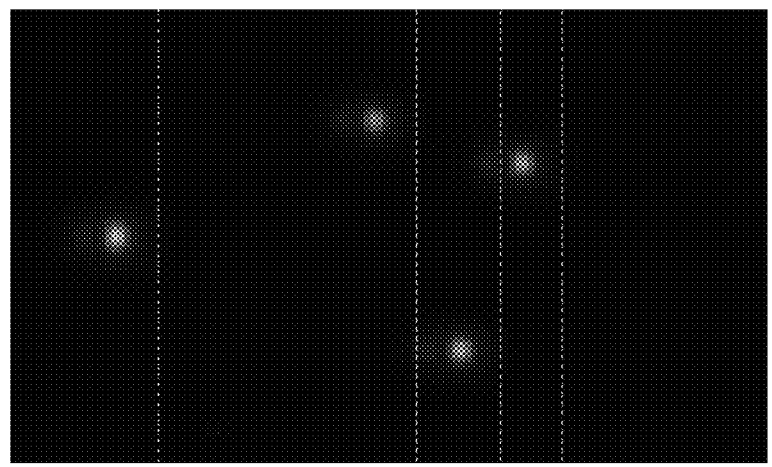
Figure 6C:
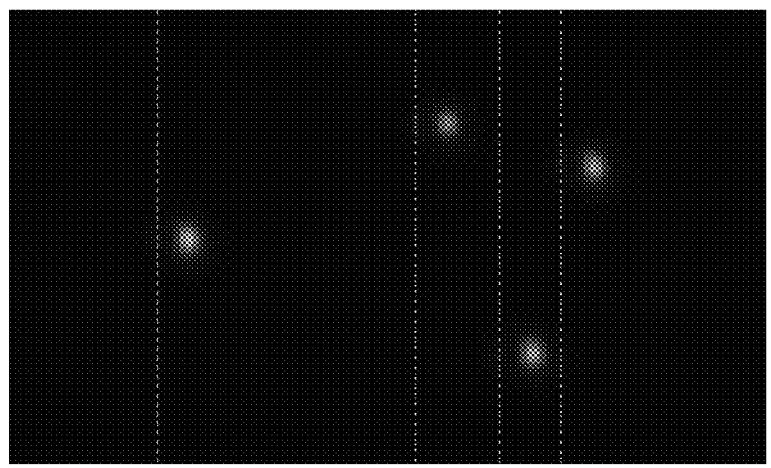

FIGS. 6A-C show three images of an image cytometer using an LED light source emitting at 488 nm and illuminating a sample of 7.3 µm fused silica beads at a 40° incidence angle. The imaging mode is sidescattering with a 7.0 mm aperture, and the magnification is 4×. FIGS. 6A-C are depictions of the same part of the sample and all three drawings show depictions 602,604,606,608 of the same four fused silica beads. All four beads are positioned 75 µm away from the focal plane of the lens system in all three drawings.

In FIG. 6A, a modulating filter is inserted in a centred position in the path of the collected light from the sample, while the collected light when capturing FIGS. 6B and 6C is modulated asymmetrically by the modulating filter. In FIG. 6B the modulating filter is offset to the left and in FIG. 6C the modulating filter is offset to the right. The modulating filter is offset in FIG. 6C as much to the right as the modulating filter is offset to the left in FIG. 6B.

Dashed lines 610,612,614,616 have been added to FIG. 6A to show the position of each depiction of the beads without any asymmetric modulation. The dashed lines at the same positions have also been added to FIGS. 6B and 6C. It is clear that the depictions of the beads are moved by the asymmetric modulation. In FIG. 6B all depictions of the beads are moved the same distance to the left in the image and in FIG. 6C the depictions are all moved the same distance and with the same distance as in FIG. 6B but to the right.

Had one of the beads been positioned further away from the focal plane than 75 µm, but had the same lateral position in the sample, the position of the depiction of that bead would have been the same in FIG. 6A but would have moved further to the left in FIG. 6B and further to the right in FIG. 6C.

Had the modulating filter been offset further from the optical axis than was done when capturing images of FIGS. 6B and 6C, the depictions of the beads would have moved further to the left in FIG. 6B and further to the right in FIG. 6C.

Items

1. A method for characterizing one or more objects in a sample, the method comprising the steps of:
    collecting transmitted, scattered, diffracted, or emitted light from the sample, including fluorescent and/or luminescent light, optionally using one or more lens(es), thus forming collected light,
    forming by said collected light on a sensor surface
        at least a first image and a second image of the object(s), wherein for at least the first and the second image the collected light is modulated asymmetrically differently, or
        at least a third image and a fourth image of the object(s), wherein focal planes of the third image and of the fourth image have different positions, or
        at least a fifth image of light of the object(s), wherein for at least the fifth image, the collected light is modulated in at least two places differently compared to the surroundings, or
        at least a sixth image and a seventh image of the object(s), wherein for at least the sixth and the seventh image the collected light is modulated asymmetrically differently and focal planes of the sixth image and of the seventh image have different positions, and
    processing
        the at least first and second images, or
        the at least third and fourth images, wherein processing is at least subtracting the third image from the fourth image,
        the at least fifth image, or
        the at least sixth and seventh images
    for characterizing one or more objects in the sample.

2. The method according to any of the preceding items further comprising the step of: illuminating the sample with incident light from an illumination element or exposing the sample to a chemical reaction, to an electrical current and/or voltage, or to stress.

3. The method according to item 1 or 2, wherein the method comprising the step of placing the sample in an image cytometer, an imaging flow cytometer, in an image cytometer that is not a flow cytometer, or in a microscope.

4. The method according to any of the preceding items, wherein processing the at least first and second images or sixth and seventh images comprises
    subtracting the first image from the second image or sixth image from the seventh image,
    calculating the mean value of the first image and the second image or of the sixth image and the seventh image,
    calculating the ratio between the first image from the second image or between the sixth image from the seventh image,
    cross-correlating the first image and the second image, the third image and the fourth image, or the sixth image and the seventh image, or
    deconvoluting the first image and/or the second image, the third image and/or the fourth image, the fifth image, or the sixth image and/or the seventh image.

5. The method according to any of the preceding items, wherein
    processing the at least first and second images comprises comparing the first image with the second image and determining the focus of the image cytometer or of the microscope based on a translation of a depiction of the one or more objects in the two images, or
    processing the at least third and fourth images comprises comparing the third image with the fourth image and determining the focus of the image cytometer or of the microscope based on a change in the contrast of a depiction of the one or more objects between the two images, or
    processing the at least fifth image comprises determining the focus of the image cytometer or of the microscope based on at least one of the objects, where an elongation of a depiction of the one or more objects is determined in the fifth image, or
    processing the at least sixth and seventh images comprises comparing the sixth image with the seventh image and determining the focus of the image cytometer or of the microscope based on a translation of and/or a change in the contrast of a depiction of the one or more objects in/between the two images.

6. The method according to any of the preceding items, wherein the direction of the light from the sample along the one or more lens(es) defines an axis, and wherein
    processing the at least first image and the second image comprises comparing the first image with the second image and determining the position along the axis of at least one of the objects based on how much the at least one object has moved between the at least first image and the second image, or
    processing the at least fifth image comprises determining the position along the axis of at least one of the objects based on an elongation of the depiction of the objects, or
    processing the at least sixth image and the seventh image comprises comparing the sixth image with the seventh image and determining the position along the axis of at least one of the objects based on how much the at least one object has moved between the at least sixth image and the seventh image.

7. The method according to any of the preceding items, wherein the light from the sample comprises emitted light from the sample of at least a first wavelength and a second wavelength, and wherein the method comprises the step of determining whether at least one of the objects has emitted light with the first wavelength or the second wavelength.

8. The method according to any of the preceding items, wherein the method comprises the step of determining the wavelength of emitted light from the sample.

9. The method according to any of the preceding items, wherein that the collected light is modulated asymmetrically means
    blocking some of the collected light, and/or
    phase shifting some of collected light.

10. The method according to any of the preceding items, wherein
    the first and the second images are both asymmetrically modulated and symmetrically asymmetrically modulated,
    the collected light modulated in at least two places differently compared to the surroundings is symmetrically modulated, or the sixth and the seventh images are both asymmetrically modulated and symmetrically asymmetrically modulated.

11. The method according to any of the preceding items, wherein the collected light is modulated asymmetrically, or the collected light is modulated in at least two places differently compared to the surroundings is achieved by inserting
a plate with at least one or two openings,
at least one or two opaque regions, and/or
at least one or two phase shifting regions
in the collected light.

12. The method according to any of the preceding items, wherein the illumination element is a source of light emitted in the range between 200 nm and 1,000 nm, in a first preferred embodiment the range is between 250 nm and 800 nm, more preferably in the range between 300 nm and 700 nm, or in a second preferred embodiment the range is between 250 nm and 400 nm, preferably where said modulation means reflect changes in phase.

13. The method according to any of the preceding items, wherein the one or more objects are in a suspension or in a colloid, where a dispersion medium of the suspension or the colloid is a solid, a liquid, or a gas.

14. The method according to any of the preceding items, wherein
processing the at least first and second images comprises comparing the first image with the second image and determining,
processing the at least fifth image comprises determining, or
processing the at least sixth and seventh images comprises comparing the sixth image with the seventh image and determining
phase quantification properties of an object in a sample, preferably where phase quantification properties include change in phase.

15. The method according to any of the preceding items, wherein processing the image or images for characterizing one or more objects in the sample comprises the step of segmenting the object.

16. The method according to item 15, wherein the object is a cell, and wherein segmenting the cell comprises identifying part of a cell, such as cytoplasm, mitochondria, golgi apparatus, lysosome, lipid globules, endoplasmic reticulum, vacuole, chloroplasts, flagellum, nucleolus, stress granule, cytoskeleton, centrosome, cell wall, cell membrane, nuclear membrane, foci comprising biomolecules or in general any element or region of the cell.

17. A method for depicting a particle or an object in a sample, the method comprising the steps of:
placing the sample in an image cytometer,
illuminating the sample with light from illumination means, where the illumination light interacts with object(s) or particle(s) of the sample,
recording one or more images of light information from the sample, and
processing the light information in the one or more images to form a depiction of the object(s) or particle(s) and/or element(s) or region(s) of the object(s) or particle(s).

18. The method according to item 17, wherein two or more images of light information from the sample are recorded.

19. The method according to any of the preceding items, wherein light information emitted from the sample is passed through movable modulation means prior to being recorded, preferably where said movable means are in different positions during the recording of the two or more images of light information from the sample.

20. The method according to any of the preceding items, wherein all optical components of image cytometer, apart from said movable means, are stationary relative to each other during the recording of two or more images of light information from the sample, preferably wherein all optical components of image cytometer, apart from said movable means, are stationary relative to each other during the recording of all images of light information from the sample.

21. The method according to any of the preceding items, wherein the collected light forms a depiction of the object on the sensor surface, wherein the depiction is used for visualization of the object and/or element or region of the object in the sample.

22. The method according to any of the preceding items, wherein the depiction is used for masking of the object and/or element or region of the object.

23. The method according to any of the preceding items, wherein the depiction is used for determining focus properties of the object.

24. The method according to any of the preceding items, wherein the depiction is used for determining position properties of the object.

25. The method according to any of the preceding items, wherein the depiction is used for determining phase quantification properties of the object, preferably where phase quantification properties include change in phase angle thus representing differences in optical density.

26. The method according to any of the preceding items, wherein at least two of the recorded images of light information are recorded under different conditions.

27. The method according to any of the preceding items, wherein the different conditions are caused by said movable light modulating means.

28. The method according to any of the preceding items, wherein said movable light modulating means modulate light having passed through and/or interacted with and/or emitted from particles or objects in the sample.

29. The method according to any of the preceding items, wherein the particle or object is a biological particle or object.

30. The method according to any of the preceding items, wherein illumination means are a source of light emitted in the range between 200 nm and 1,000 nm, preferably in the range between 250 nm and 800 nm, more preferably in the range between 300 nm and 700 nm.

31. The method according to any of the preceding items, wherein illumination means are a source of light emitted in the range between 250 nm and 400 nm, preferably where said modulation means reflect changes in phase angle.

32. The method according to any of the preceding items, wherein illumination means are located on the main optical axis connecting the sample and the detector of the image cytometer.

33. The method according to any of the preceding items, wherein illumination means illuminate the sample at an inclination relative to the main optical axis of the image cytometer 34. The method according to any of the preceding items, wherein the interaction of illuminated/incident light and particle or object gives rise to one or more of the following, transmission, absorption, refraction, diffraction, Mie scatter, Raleigh scatter, Raman scatter, photoluminescence.

35. The method according to any of the preceding items, wherein said movable light modulating means affect phase of light, preferably where said movable light modulating means are in an arrangement where phase shifts in light from the sample is converted to brightness changes in the image.

36. The method according to any of the preceding items, wherein at least one of the at least two recoded images of light information is a phase-contrast microscopy image.

37. The method according to any of the preceding items, wherein at least two recorded images are phase-contrast microscopy images where conversion of phase shifts of light to brightness changes is substantially different.

38. The method according to any of the preceding items, wherein difference in conversion of phase shifts or light to brightness changes in the at least two recorded images is caused by moving modulating means.

39. The method according to any of the preceding items, wherein at least one of the at least two recorded images is an image where at least part of light signal from the sample is blocked by the presence of an opaque member in the light path.

40. The method according to any of the preceding items, wherein said movable light modulating means, or at least an element of said movable light modulating means, are in different position during recording of two or more images of light intensity information.

41. The method according to any of the preceding items, wherein said movable light modulating means are a sheet of parallel optical material, preferably optical glass.

42. The method according to any of the preceding items, wherein parallel optical material has different optical properties in different regions of the parallel optical material.

43. The method according to any of the preceding items, wherein parallel optical material has a region of different optical property that can be positioned approximately in central alignment with the main optical axis of the image cytometer, preferably where the region is symmetrical, more preferably where the region is circular.

44. The method according to any of the preceding items, wherein parallel optical material has variable thickness in different regions, preferably where the variable in thickness causes substantially different phase-shift of light passing through different regions.

45. The method according to any of the preceding items, wherein parallel optical material has regions of different attenuation, preferably where attenuation of some region(s) is substantially opaque.

46. The method according to any of the preceding items, wherein parallel optical material has a region of different optical property in central alignment with the main optical axis of the image cytometer that is substantially transparent, preferably where other regions of parallel optical material are substantially opaque.

47. The method according to any of the preceding items, wherein illumination means illuminates the sample with light that is substantially collimated, preferably where the light is parallel.

48. The method according to any of the preceding items, wherein the illumination light is substantially parallel to the main optical axis, preferably where the illumination light is parallel to the main optical axis.

49. The method according to any of the preceding items, wherein illumination means illuminates the sample with light that is substantially focused onto the plane of the sample, such that the light illuminating the sample is at an angle to the main optical axis.

50. The method according to any of the preceding items, wherein the method of processing light information is one or more of the following methods, addition of images, subtraction of images, ratio between images, cross-correlation between images, deconvolution of optical phase and intensity.

51. The method according to any of the preceding items, wherein processing is the determination of spatial position of an image representation of the particle or object in a recorded image of light information, preferably where information of maximum-signal-intensity of light information determines spatial position of an image representation of the particle or object in a recorded image, more preferably where information of centre-of-gravity of light information determines spatial position of an image representation of the particle or object in a recorded image.

52. The method according to any of the preceding items, wherein fluorescent light is light information used to depict a biological particle or object.

53. The method according to any of the preceding items, wherein side-scattered light is light information used to depict a biological particle or object 54. The method according to any of the preceding items, wherein biological particle or object in the sample is adhering to a surface, such as the surface of the sample compartment.

55. The method according to any of the preceding items, wherein one element or region of particle or object is the boundary of the particle or object.

56. The method according to any of the preceding items, wherein one element or region of particle or object is a region of the particle or object contained within the boundary of the particle or object.

57. The method according to any of the preceding items, wherein one element or region of biological particle or object contains the nucleus of the particle or object.

58. The method according to any of the preceding items, wherein one element or region of biological particle or object is the cytoplasm.

59. The method according to any of the preceding items, wherein one or more elements or regions of biological particle or object is one or more of the following; mitochondria, golgi apparatus, lysosome, endoplasmic reticulum, vacuole, chloroplasts, flagellum, nucleolus, stress granule, cytoskeleton, centrosome, cell wall, cell membrane, nuclear membrane, foci comprising biomolecules.

60. The method according to any of the preceding items, wherein the method is used to estimate the size of the particle or object.

61. The method according to any of the preceding items, wherein the biological particle or object is a cell and the method is used to determine the status of the cell cycle.

62. The method according to any of the preceding items, wherein the biological particle or object is a cell and the method is used to determine the viability of cell.

63. The method according to any of the preceding items, wherein the biological particle or object is a cell and the method is used to determine the vitality of cell.

64. The method according to any of the preceding items, wherein the method is used to estimate the number of particles or objects present in the view of the image cytometer.

65. The method according to any of the preceding items, wherein the biological particle or object is a cell, such as an animal cell, or a plant cell, or a fungal cell or a bacteria cell.

66. The method according to any of the preceding items, wherein the biological particle or object is adhering to a surface.

67. The method according to any of the preceding items, wherein the biological particle or object is in suspension.

68. The method according to any of the preceding items, wherein depicting of the biological particle or object is carried out when the particle or object in suspension has sedimented such that the particle or object is in close proximity to a surface of a sample compartment.

69. The method according to any of the preceding items, wherein the light used to illuminate the sample is generated by a single light emitting diode.

The method according to any of the preceding items, wherein the light used to illuminate the sample is generated by two or more light emitting diodes.

70. The method according to any of the preceding items, wherein the optical magnification of the image cytometer is ×100 or less, preferably where the optical magnification of the image cytometer is ×60 or less.

71. The method according to any of the preceding items, wherein the optical magnification of the image cytometer is ×60 or less, preferably where the optical magnification of the image cytometer is ×20 or less.

72. The method according to any of the preceding items, wherein the optical magnification of the image cytometer is ×10 or less, preferably where the optical magnification of the image cytometer is ×4 or less.

73. The method according to any of the preceding items, wherein the optical magnification of the image cytometer is ×2 or less.

A system for characterizing one or more objects like a biological object and/or element or region of a biological object in a sample, where the system is configured to perform the method steps according to any of the preceding items.

The invention claimed is:

1. A method for characterising one or more objects in a sample, the method comprising the steps of:
    collecting transmitted, refracted, scattered, diffracted, or emitted light from the sample, wherein the light comprises fluorescent or luminescent light, thus forming collected light,
    forming by said collected light on a sensor surface at least a first image and a second image of the object(s), wherein for at least the first and the second image the collected light is modulated asymmetrically differently after the sample,
    processing
        the at least first and second images by performing at least one of:
            comparing the first image with the second image for determining a position of focus of an image cytometer or of a microscope based on a translation of a depiction of the one or more objects in the first image and the second image, and
            subtracting the first image from the second image for increasing the contrast at the edges of the objects;
        wherein the one or more objects is a cell or a particle, element or region of a cell.

2. The method according to claim 1, further comprising the step of: illuminating the sample with incident light from an illumination element or exposing the sample to a chemical reaction, to an electrical current or voltage or to stress.

3. The method according to claim 2, wherein the illumination element is a source of light emitted in the range between 200 nm and 1,000 nm.

4. The method according to claim 1, further comprising the step of placing the sample in an image cytometer, an imaging flow cytometer, in an image cytometer that is not a flow cytometer, or in a microscope.

5. The method according to claim 1, wherein processing the at least first and second images comprises
    subtracting the first image from the second image,
    calculating the mean value of the first image and the second image,
    calculating the ratio between the first image from the second image,
    cross-correlating the first image and the second image, or
    deconvoluting the first image or the second image.

6. The method according to claim 1, wherein the direction of the light from the sample along the one or more lens(es) defines an axis.

7. The method according to claim 1, wherein the light from the sample comprises emitted light from the sample of at least a first wavelength and a second wavelength, and wherein the method comprises the step of determining whether at least one of the objects has emitted light with the first wavelength or the second wavelength.

8. The method according to claim 1, further comprising the step of determining the wavelength of emitted light from the sample.

9. The method according to claim 1, wherein the collected light is modulated asymmetrically comprises
    blocking some of the collected light, or
    phase shifting some of collected light.

10. The method according to claim 1, wherein
    the first and the second images are both asymmetrically modulated and symmetrically asymmetrically modulated, or
    the collected light modulated in at least two places differently compared to the surroundings is symmetrically modulated.

11. The method according to claim 1, wherein the collected light is modulated asymmetrically, or the collected light is modulated in at least two places differently compared to the surroundings is achieved by inserting
    a plate with at least one or two openings,
    at least one or two opaque regions, or
    at least one or two phase shifting regions
    in the collected light.

12. The method according to claim 1, wherein the one or more objects are in a suspension or in a colloid, where a dispersion medium of the suspension or the colloid is a solid, a liquid, or a gas.

13. The method according to claim 1, wherein
    processing the at least first and second images comprises comparing the first image with the second image and determining
    phase quantification properties of the object in the sample.

14. The method according to claim 1, wherein processing the image or images for characterising one or more objects in the sample comprises the step of segmenting the object.

15. The method according to claim 14, wherein the object is a biological cell, and wherein segmenting the cell comprises identifying one or more parts of the cell.

16. A system for characterising one or more objects in a sample, wherein the system comprises an image cytometer or a microscope, and wherein the system is configured to perform the method steps according to claim 1.

17. A method for characterising one or more objects in a sample performed by an image cytometer or a microscope, the method comprising the steps of:
    collecting transmitted, refracted, scattered, diffracted, or emitted light from the sample, wherein the light comprises fluorescent or luminescent light, using one or more lens(es), thus forming collected light, forming by said collected light on a sensor surface
at least a first image and a second image of the object(s), wherein for at least the first and the second image the collected light is modulated asymmetrically differently after the sample, and
processing
the at least first and second images by comparing the first image with the second image for
determining a position along an axis of at least one of the objects based on how much the at least one object has moved between the at least first image and the at least second image, wherein the axis is defined by a direction of the light from the sample along the one or more lens(es);
wherein the one or more objects is a cell or a particle, element or region of a cell.

* * * * *